United States Patent
Sundstrom et al.

(10) Patent No.: US 8,390,430 B1
(45) Date of Patent: *Mar. 5, 2013

(54) RFID READERS MITIGATING COLORED NOISE

(75) Inventors: Kurt E. Sundstrom, Woodinville, WA (US); Paul Dietrich, Seattle, WA (US); Christopher J. Diorio, Shoreline, WA (US); Andrew Friefeld, Redmond, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/571,861

(22) Filed: Aug. 10, 2012

Related U.S. Application Data

(63) Continuation of application No. 12/568,645, filed on Sep. 28, 2009.

(51) Int. Cl.
*H04Q 5/22* (2006.01)

(52) U.S. Cl. .................................. 340/10.1; 340/572.2

(58) Field of Classification Search ................ 455/63.1; 375/346; 708/322; 340/572.2, 10.1
See application file for complete search history.

(56) References Cited

U.S. PATENT DOCUMENTS

| | | | |
|---|---|---|---|
| 2002/0097821 A1* | 7/2002 | Hebron et al. | 375/346 |
| 2002/0126778 A1* | 9/2002 | Ojard et al. | 375/346 |
| 2003/0037084 A1* | 2/2003 | Walsh et al. | 708/322 |
| 2006/0261952 A1* | 11/2006 | Kavounas et al. | 340/572.2 |
| 2007/0117511 A1* | 5/2007 | Kwon et al. | 455/63.1 |

\* cited by examiner

*Primary Examiner* — Hai Phan
*Assistant Examiner* — Kaleria Knox
(74) *Attorney, Agent, or Firm* — Turk IP Law, LLC

(57) ABSTRACT

An RFID reader uses an adaptive filter to mitigate the effects of colored noise in tag reply signals. The adaptive filter may be a linear equalizer, a linear-predictive canceller, or a decision-feedback equalizer. The adaptive filter estimates the colored noise portion of the signal received from the tag and removes the noise estimate from the tag signal. The adaptive filter bases its noise estimate on the difference between a desired signal and a portion of the received signal. The reader uses reader-generated training data, a CW signal, and/or portions of the tag reply signal to adapt the filter.

8 Claims, 22 Drawing Sheets

READER METHODS

SIGNAL PATH DURING R→T

SIGNAL PATH DURING T→R

*RFID READER SYSTEM DETAIL*

2110

TAG REPLY DATA

2120

TAG REPLY DATA + COLORED NOISE

2130

FILTERED TAG REPLY DATA (EQUALIZER OUTPUT)

COMPARISON OF NOISE-FREE, NOISY, AND FILTERED TAG REPLY DATA

ARCHITECTURE OF INTERFACE CONVERTER WITH AGENT AND UTILITY

SAMPLE SCREENSHOT OF AN INTERFACE CONVERTER EXPOSING TO AN AGENT OPTIONS TO CONTROL THE FUNCTIONALITY OF A UTILITY

RFID READERS MITIGATING COLORED NOISE

CROSS REFERENCE TO RELATED APPLICATIONS

This application claims the benefit of U.S. patent application Ser. No. 12/568,645 filed on Sep. 28, 2009. The disclosure of the patent application is hereby incorporated by reference for all purposes.

BACKGROUND

Radio Frequency Identification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field. The RF wave may encode one or more commands that instruct the tags to perform one or more actions.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded information can denote a serial number, a price, a date, a destination, other attribute(s), any combination of attributes, and so on. Accordingly, when a reader reads a tag code, information can be learned about the associated item that hosts the tag, and/or about the tag itself.

An RFID tag typically includes an antenna system, a radio section, a power management section, and frequently a logical section, a memory, or both. In some RFID tags the power management section includes an energy storage device, such as a battery. RFID tags with an energy storage device are known as active or battery-assisted tags. Advances in semiconductor technology have miniaturized the electronics so much that an RFID tag can be powered solely by the RF signal it receives. Such RFID tags do not include an energy storage device such as a battery, and are called passive tags. Regardless of the type, all tags typically store or buffer some energy temporarily in passive storage devices such as capacitors.

RFID readers often communicate with populations of tags, performing operations such as inventorying or otherwise interacting with the tags. To perform such communications, the reader must establish a reliable communications link with the tags. Unfortunately, the real-world environment where readers and tags operate contains unavoidable RF noise. White noise (noise with a flat frequency spectrum) is always present; colored noise (noise that is more prominent on some frequencies than on others) may be present as well. Some of this noise will fall within the channel or channels used by a reader and tags to communicate, degrading the communications.

As one example, thermal fluctuations in the RF environment cause broadband white noise at RF frequencies. As another example, fluorescent lights can amplitude modulate (AM) the RF waves used in RFID communication, creating sidebands (signal components) at frequencies offset from the frequencies of the RF waves. Such sidebands are one example of colored noise. In some cases these AM sidebands fall within the tag reply spectrum, and can cause symbol decoding errors in the reader. Traditional RFID readers employ channel filters, as well as data filters matched to the tag signal waveforms, to attenuate noise that falls outside the tag reply spectrum. These filters are effective against white and colored noise that falls outside the reply spectrum, but they cannot mitigate noise, such as the above-mentioned colored noise from fluorescent lights, that falls within the tag reply spectrum. Furthermore, these filters do not reduce inter-symbol-interference (ISI) that can be introduced by the RF channel or by the reader analog front-end electronics.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to mitigating the effects of colored noise in an RFID reader system by employing adaptive filters. These embodiments also include methods for training RFID readers to cancel or otherwise equalize the colored noise sources. Embodiments are further directed to instructing RFID tags to transmit training sequences known by the reader to facilitate reader training.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying Drawings, in which.

DETAILED DESCRIPTION

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

Figure 1:
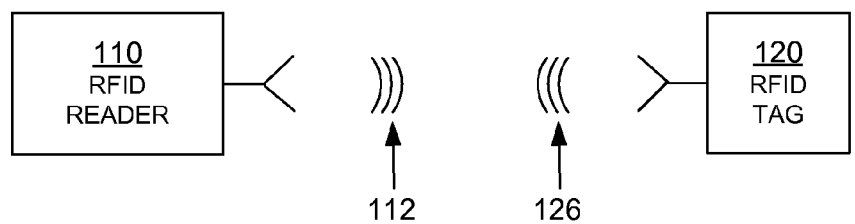
FIG. 1 is a block diagram of components of an RFID system.

FIG. 1 is a diagram of components of a typical RFID system 100, incorporating aspects of the present disclosure. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 2.4 GHz, and so on.

Encoding the data can be performed in a number of ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1," if that is desired. In turn, when the symbols are processed internally by reader 110 and tag 120, they can be equivalently considered and treated as numbers having corresponding values, and so on.

Tag 120 can be a passive tag, or an active or battery-assisted tag (i.e., having its own power source). Where tag 120 is a passive tag, it is powered from wave 112.

Figure 2:
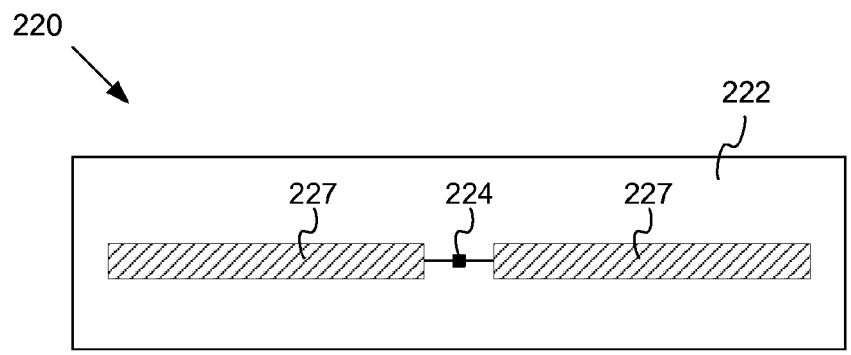
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active and battery-assisted tags.

Tag 220 is formed on a substantially planar inlay 222, which can be made in many ways known in the art. Tag 220 includes an electrical circuit which is preferably implemented as an integrated circuit (IC) 224. IC 224 is arranged on inlay 222.

Tag 220 also includes an antenna for exchanging wireless signals with its environment. The antenna is usually flat and attached to inlay 222. IC 224 is electrically coupled to the antenna via suitable antenna terminals (not shown in FIG. 2).

The antenna may be made in a number of ways, as is well known in the art. In the example of FIG. 2, the antenna is made from two distinct antenna segments 227, which are shown here forming a dipole. Many other embodiments are possible, using any number of antenna segments.

In some embodiments, an antenna can be made with even a single segment. Different points of the segment can be coupled to one or more of the antenna terminals of IC 224. For example, the antenna can form a single loop, with its ends coupled to the terminals. It should be remembered that, when the single segment has more complex shapes, even a single segment could behave like multiple segments at the frequencies of RFID wireless communication.

In operation, a signal is received by the antenna 227 and communicated to IC 224. IC 224 both harvests power, and responds if appropriate, based on the incoming signal and the IC's internal state. In order to respond by replying, IC 224 modulates the reflectance of the antenna, which generates backscatter 126 from wave 112 transmitted by the reader. Coupling together and uncoupling the antenna terminals of IC 224 can modulate the antenna's reflectance, as can a variety of other means.

In the embodiment of FIG. 2, antenna segments 227 are separate from IC 224. In other embodiments, antenna segments may alternatively be formed on IC 224, and so on.

The components of the RFID system of FIG. 1 may communicate with each other in any number of modes. One such mode is called full duplex. Another such mode is called half-duplex, and is described below.

Figure 3:
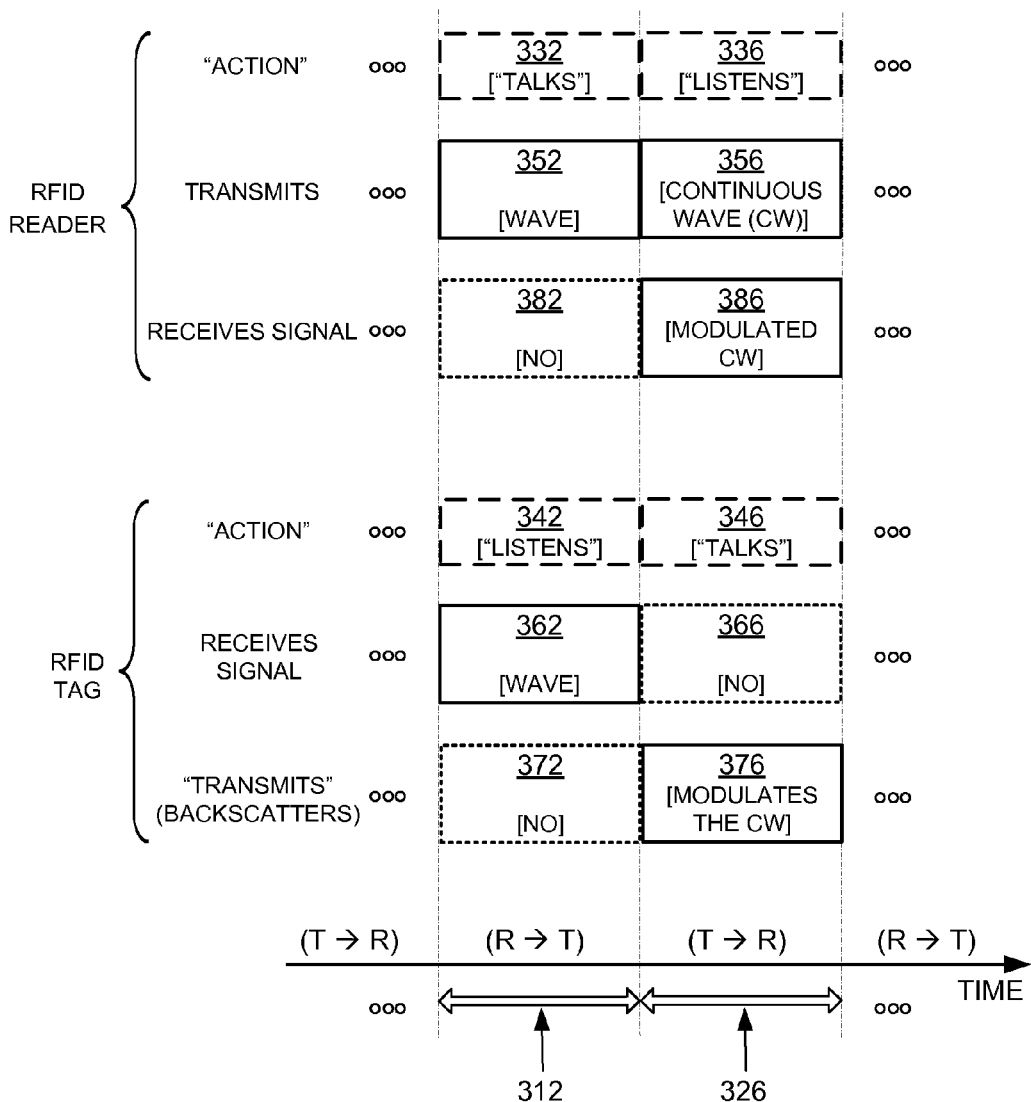
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326— here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 376, so as to generate backscatter wave 126. Concurrently, according to block 386, reader 110 receives backscatter wave 126 and processes it.

Tag 120 can respond with a backscatter that is modulated directly onto the frequency of the reader's emitted CW, also called baseband backscatter. Alternatively, tag 120 can respond with a backscatter that is modulated onto a frequency, developed by tag 120, that is different from the reader's emitted CW, and this modulated tag frequency is then impressed upon the reader's emitted CW. This second type of backscatter is called subcarrier backscatter.

Embodiments of the present disclosure can be useful in different RFID environments, for example, in the deployment of RFID readers in warehouse environments, in retail environments, in point-of-sale environments, in the environments of financial institutions, in environments of data-management institutions, in library environments, and the like.

Figure 4:
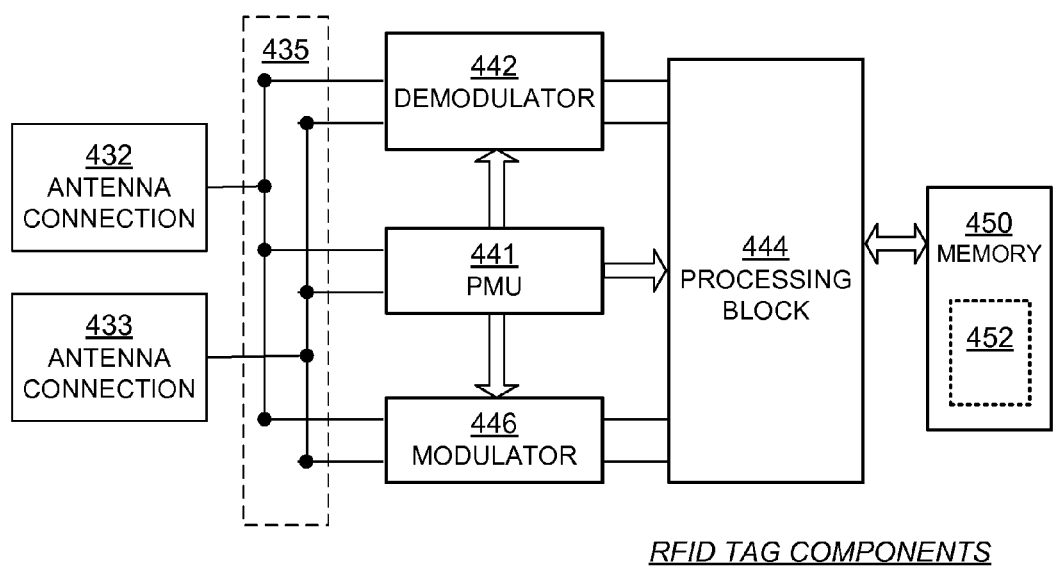
FIG. 4 is a block diagram of an electrical circuit implementation of the IC of the tag of FIG. 2.

FIG. 4 is a block diagram showing a detail of an RFID IC, such as the one shown in FIG. 2. Electrical circuit 424 in FIG. 4 may be formed in an IC of an RFID tag, such as IC 224 of FIG. 2. Circuit 424 has a number of main components that are described in this document. Circuit 424 may have a number of additional components from what is shown and described, or different components, depending on the exact implementation.

Circuit 424 includes at least two antenna terminals 432, 433, which are suitable for coupling to one or more antenna segments (not shown in FIG. 4). Antenna terminals 432, 433 may be made in any suitable way, such as using pads and so on. In a number of embodiments more than two antenna terminals are used, especially in embodiments where more antenna segments are used.

Circuit 424 includes a section 435. Section 435 may be implemented as shown, for example as a group of nodes for proper routing of signals. In some embodiments, section 435 may be implemented otherwise, for example to include a receive/transmit switch that can route a signal, and so on.

Circuit 424 also includes a Rectifier and PMU (Power Management Unit) 441. Rectifier and PMU 441 may be implemented in any way known in the art, for harvesting raw RF energy received via antenna terminals 432, 433. In some embodiments, block 441 may include more than one rectifier.

In operation, an RF wave received via antenna terminals 432, 433 is received by Rectifier and PMU 441, which in turn generates power for the electrical circuits of IC 424. This is true for either or both reader-to-tag (R→T) and tag-to-reader (T→R) sessions, whether or not the received RF wave is modulated.

Circuit 424 additionally includes a demodulator 442. Demodulator 442 demodulates an RF signal received via antenna terminals 432, 433. Demodulator 442 may be implemented in any way known in the art, for example including an attenuator stage, an amplifier stage, and so on.

Circuit 424 further includes a processing block 444. Processing block 444 receives the demodulated signal from demodulator 442, and may perform operations. In addition, it may generate an output signal for transmission.

Processing block 444 may be implemented in any way known in the art. For example, processing block 444 may include a number of components, such as a processor, memory, a decoder, an encoder, and so on.

Circuit 424 additionally includes a modulator 446. Modulator 446 modulates an output signal generated by processing block 444. The modulated signal is transmitted by driving antenna terminals 432, 433, and therefore driving the load presented by the coupled antenna segment or segments. Modulator 446 may be implemented in any way known in the art, for example including a driver stage, amplifier stage, and so on.

In one embodiment, demodulator 442 and modulator 446 may be combined in a single transceiver circuit. In another embodiment, modulator 446 may include a backscatter transmitter or an active transmitter. In yet other embodiments, demodulator 442 and modulator 446 are part of processing block 444.

Circuit 424 additionally includes a memory 450, which stores data 452. Memory 450 is preferably implemented as a Nonvolatile Memory (NVM), which means that data 452 is retained even when circuit 424 does not have power, as is frequently the case for a passive RFID tag.

In terms of processing a signal, circuit 424 operates differently during a R→T session and a T→R session. The different operations are described below, in this case with circuit 424 representing an IC of an RFID tag.

Figure 5A:
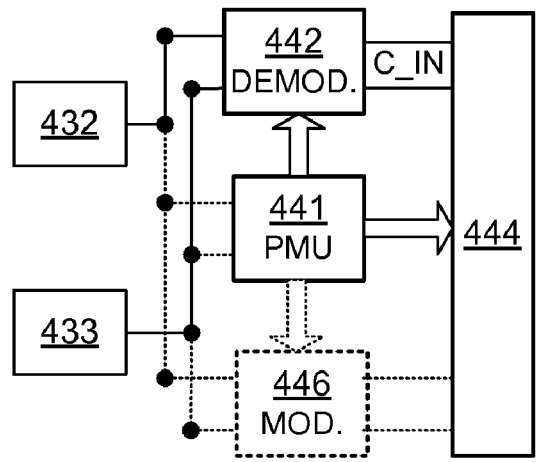
FIG. 5A is block diagram of components of the circuit of FIG. 4, modified to emphasize a signal operation during a Reader to Tag (R→T) session of FIG. 3.

FIG. 5A shows version 524-A of components of circuit 424 of FIG. 4, further modified to emphasize a signal operation during a R→T session (receive mode of operation) during time interval 312 of FIG. 3. An RF wave is received by antenna terminals 432, 433; a signal is demodulated by demodulator 442; and the demodulated signal is input to processing block 444 as C_IN. In one embodiment, C_IN may include a received stream of symbols.

Version 524-A shows as relatively obscured those components that do not play a part in processing a signal during a R→T session. Indeed, Rectifier and PMU 441 may be active, but only in converting raw RF power. And modulator 446 generally does not transmit during a R→T session. Modulator 446 typically does not interact with the received RF wave significantly, either because switching action in section 435 of FIG. 4 decouples the modulator 446 from the RF wave, or by designing modulator 446 to have a suitable impedance, and so on.

While modulator 446 is typically inactive during a R→T session, it need not be always the case. For example, during a R→T session, modulator 446 could be active in other ways. For example, it could be adjusting its own parameters for operation in a future session.

Figure 5B:
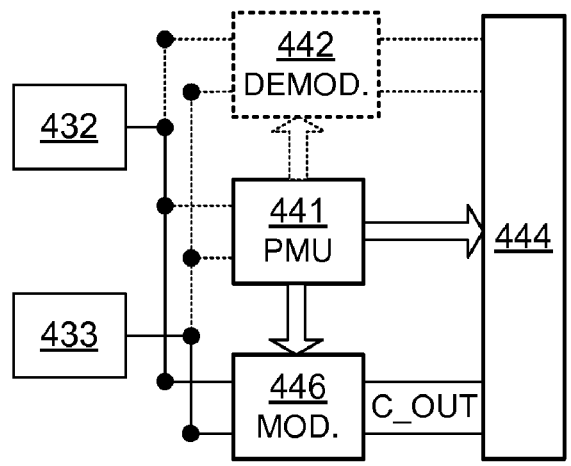
FIG. 5B is the block diagram of components of the circuit of FIG. 4, modified to emphasize a signal operation during a Tag to Reader (T→R) session of FIG. 3.

FIG. 5B shows version 524-B of components of circuit 424 of FIG. 4, further modified to emphasize a signal operation during a T→R session during time interval 326 of FIG. 3. A signal is output from processing block 444 as C_OUT. In one embodiment, C_OUT may include a stream of symbols for transmission. C_OUT is then modulated by modulator 446, and output as an RF wave via antenna terminals 432, 433.

Version 524-B shows as relatively obscured those components that do not play a part in processing a signal during a T→R session. Indeed, Rectifier and PMU 441 may be active, but only in converting raw RF power. And demodulator 442 generally does not receive during a T→R session. Demodulator 442 typically does not interact with the transmitted RF wave, either because switching action in section 435 decouples the demodulator 442 from the RF wave, or by designing demodulator 442 to have a suitable impedance, and so on.

While demodulator 442 is typically inactive during a T→R session, it need not be always the case. For example, during a T→R session, demodulator 442 could be active in other ways. For example, it could be adjusting its own parameters for operation in a future session.

Figure 6:
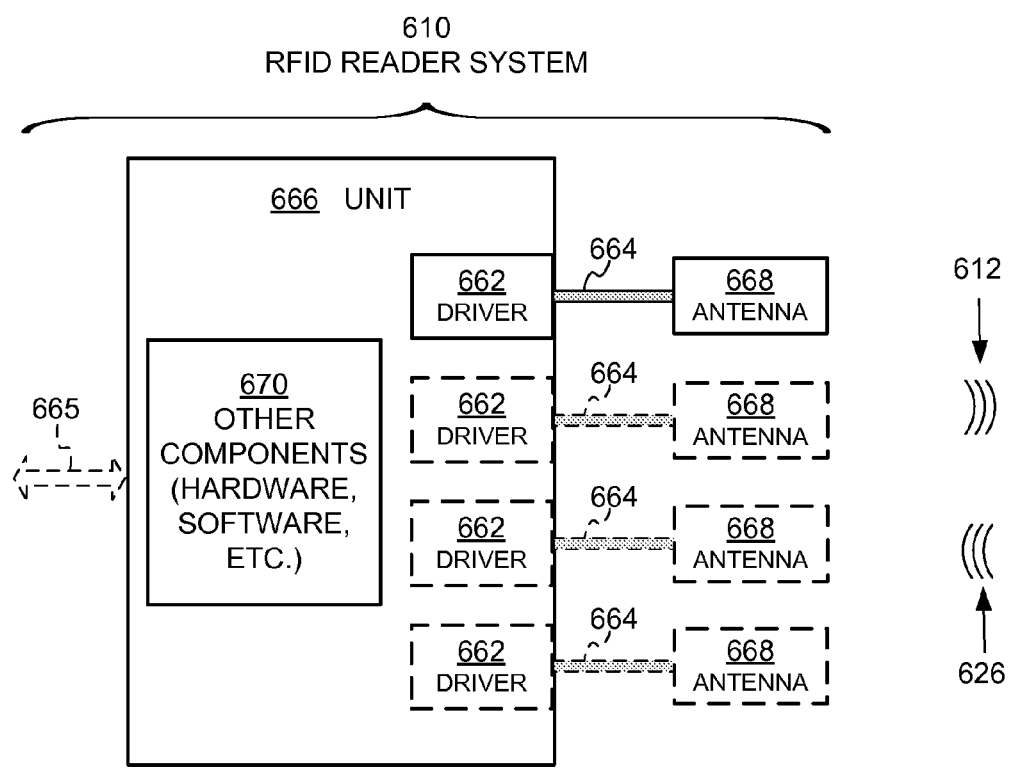
FIG. 6 is a block diagram showing a detail of an RFID reader system, such as the one shown in FIG. 1.

FIG. 6 is a block diagram showing a detail of an RFID reader system 610, which can be the same as reader 110 shown in FIG. 1. A unit 666 may also known as a reader 666, and has one or more antenna drivers 662. In some embodiments it has four drivers 662. For each driver 662 there is typically a connector attached to the respective driver, and these connectors can be attached to respective antennas 668 via RF cables 664.

A driver 662 can send to its respective antenna 668 a driving signal that is in the RF range, which is why cable 664 is typically but not necessarily a coaxial cable. The driving signal causes the antenna 668 to transmit an RF wave 612, which is analogous to RF wave 112 of FIG. 1. In addition, RF wave 626 can be backscattered from the RFID tags, analogous to RF wave 126 of FIG. 1. Backscattered RF wave 626 is received by an antenna 668 and ultimately becomes a signal sensed by unit 666.

Unit 666 also has other components 670, such as hardware and/or software and/or firmware, which may be described in more detail later in this document. Components 670 control drivers 662, and as such cause RF wave 612 to be transmitted, and the sensed backscattered RF wave 626 to be interpreted. Optionally and preferably there is a communication link 665 to other equipment, such as computers and the like, for remote operation of system 610.

Figure 7:
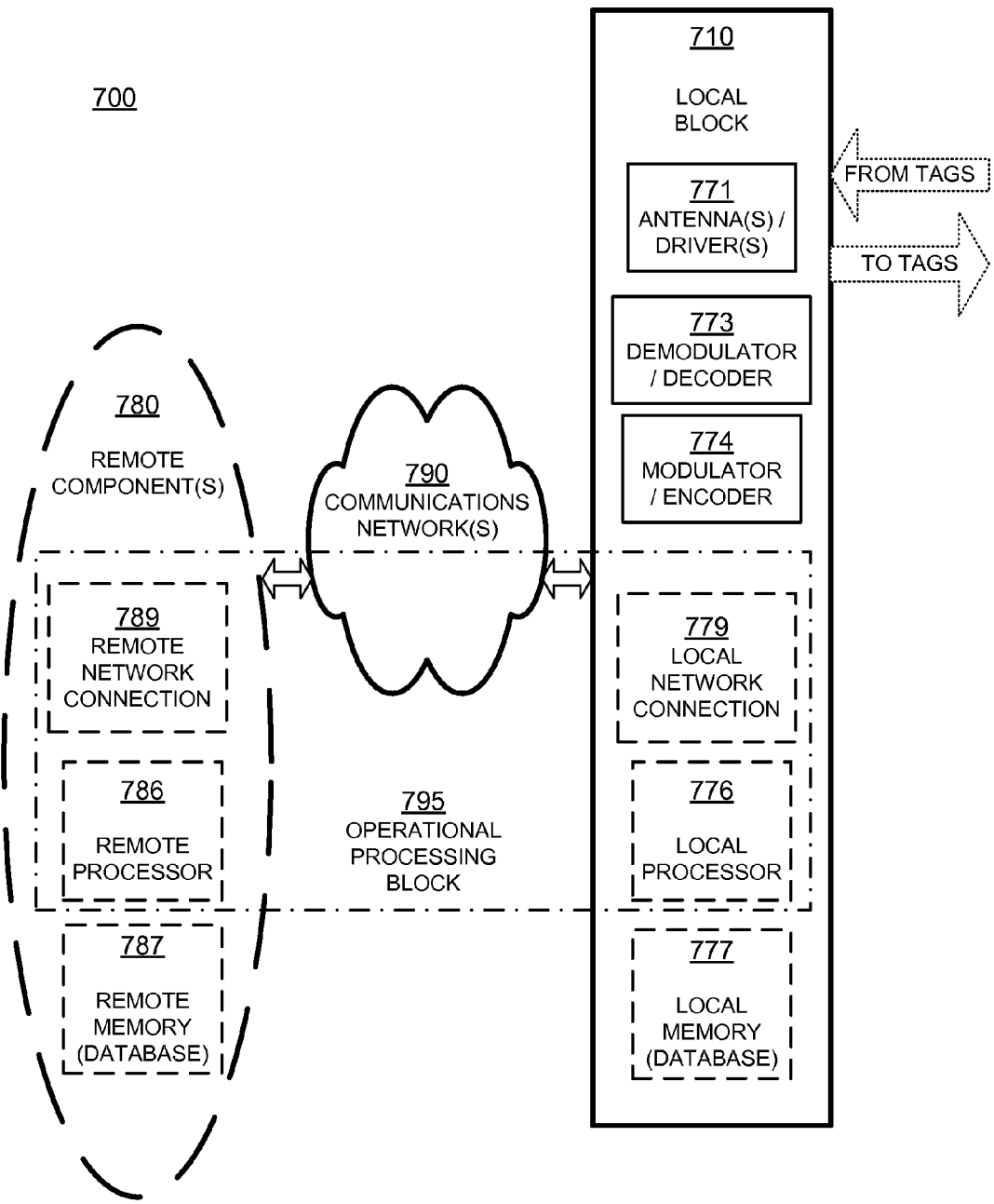
FIG. 7 is a block diagram of a whole RFID reader system according to embodiments.

FIG. 7 is a block diagram of a whole RFID reader system 700 according to embodiments. System 700 includes a local block 710, and optionally remote components 780. Local block 710 and remote components 780 can be implemented in any number of ways. It will be recognized that reader 110 of FIG. 1 is the same as local block 710, if remote components 780 are not provided. Alternately, reader 110 can be implemented instead by system 700, of which only the local block 710 is shown in FIG. 1. Plus, local block 710 can be unit 666 of FIG. 6.

Local block 710 is responsible for communicating with the tags. Local block 710 includes a block 771 of an antenna and a driver of the antenna for communicating with the tags. Some readers, like that shown in local block 710, contain a single antenna and driver. Some readers contain multiple antennas and drivers and a method to switch signals among them, including sometimes using different antennas for transmitting and for receiving. And some readers contain multiple antennas and drivers that can operate simultaneously. A demodulator/decoder block 773 demodulates and decodes waves received from the tags via antenna block 771. Modulator/encoder block 774 encodes and modulates an RF wave that is to be transmitted to the tags via antenna block 771.

Local block 710 additionally includes an optional local processor 776. Processor 776 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 773, the encoding function in block 774, or both, may be performed instead by processor 776. In some cases processor 776 may implement an encryption or authorization function; in some cases one or more of these functions can be distributed among other blocks such as encoding block 774, or may be entirely incorporated in another block.

Local block 710 additionally includes an optional local memory 777. Memory 777 may be implemented in any number of ways known in the art. Such ways include, by way of examples and not of limitation, nonvolatile memories (NVM), read-only memories (ROM), random access memories (RAM), any combination of one or more of these, and so on. These can be implemented separately from processor 776, or in a single chip, with or without other components. Memory 777, if provided, can store programs for processor 776 to run, if needed.

In some embodiments, memory 777 stores data read from tags, or data to be written to tags, such as Electronic Product Codes (EPCs), Tag Identifiers (TIDs) and other data. Memory 777 can also include reference data that is to be compared to the EPC codes, instructions and/or rules for how to encode commands for the tags, modes for controlling antenna 771, and so on. In some of these embodiments, local memory 777 is provided as a database. In some cases memory 777 may contain information associated with selection of desired tag regions versus undesired tag regions, what type of distract signal may be transmitted, and the like.

Some components of local block 710 typically treat the data as analog, such as the antenna/driver block 771. Other components such as memory 777 typically treat the data as digital. At some point there is a conversion between analog and digital. Based on where this conversion occurs, a whole reader may be characterized as "analog" or "digital", but most readers contain a mix of analog and digital functionality.

If remote components 770 are indeed provided, they are coupled to local block 710 via an electronic communications network 790. Network 790 can be a Local Area Network (LAN), a Metropolitan Area Network (MAN), a Wide Area Network (WAN), a network of networks such as the internet, or a mere local communication link, such as a USB, PCI, and so on. In turn, local block 710 then includes a local network connection 779 for communicating with network 790. Communications on the network can be secure, such as if they are encrypted or physically protected, or insecure, such as if they are not encrypted or otherwise protected.

There can be one or more remote component(s) 780. If more than one, they can be located at the same location, or in different locations. They can access each other and local block 710 via network 790, or via other similar networks, and so on. Accordingly, remote component(s) 780 can use respective remote network connections. Only one such remote network connection 789 is shown, which is similar to local network connection 779, etc.

Remote component(s) 780 can also include a remote processor 786. Processor 786 can be made in any way known in the art, such as was described with reference to local processor 776. Remote processor 786 may also implement an encryption function, similar to local processor 776.

Remote component(s) 780 can also include a remote memory 787. Memory 787 can be made in any way known in the art, such as was described with reference to local memory 777. Memory 787 may include a local database, and a different database of a Standards Organization, such as one that can reference EPCs. Remote memory 787 may also contain information associated with selection of desired tag regions versus undesired tag regions, what type of distract signal is to be transmitted, or the like, similar to local memory 777.

Of the above-described elements, it is advantageous to consider a combination of these components, designated as operational processing block 795. Block 795 includes those components that are provided of the following: local processor 776, remote processor 786, local network connection 779, remote network connection 789, and by extension an applicable portion of network 790 that links remote network connection 789 with local network connection 779. The portion can be dynamically changeable, etc. In addition, block 795 can receive and decode RF waves received via antenna 771, and cause antenna 771 to transmit RF waves according to what it has processed.

Block 795 includes either local processor 776, or remote processor 786, or both. If both are provided, remote processor 786 can be made such that it operates in a way complementary with that of local processor 776. In fact, the two can cooperate. It will be appreciated that block 795, as defined this way, is in communication with both local memory 777 and remote memory 787, if both are present.

Accordingly, block 795 is location agnostic, in that its functions can be implemented either by local processor 776, or by remote processor 786, or by a combination of both. Some of these functions are preferably implemented by local processor 776, and some by remote processor 786. Block 795 accesses local memory 777, or remote memory 787, or both for storing and/or retrieving data.

Reader system 700 operates by block 795 generating communications for RFID tags. These communications are ultimately transmitted by antenna block 771, with modulator/encoder block 774 encoding and modulating the information on an RF wave. Then data is received from the tags via antenna block 771, demodulated and decoded by demodulator/decoder block 773, and processed by processing block 795.

Embodiments of an RFID reader system can be implemented as hardware, software, firmware, or any combination. It is advantageous to consider such a system as subdivided into components or modules. A person skilled in the art will recognize that some of these components or modules can be implemented as hardware, some as software, some as firmware, and some as a combination. An example of such a subdivision is now described, together with the RFID tag as an additional module.

Figure 8:
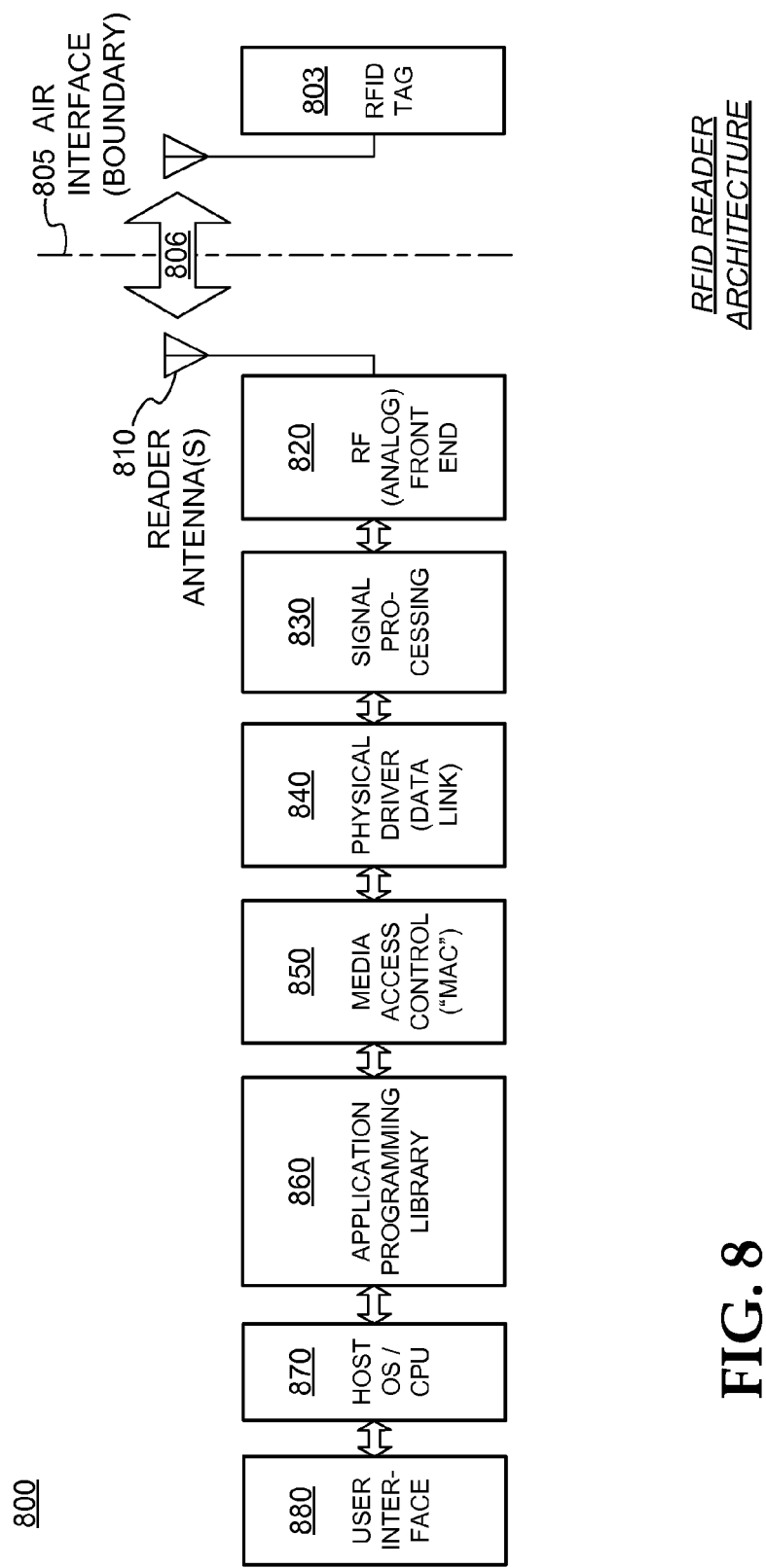
FIG. 8 is a block diagram illustrating an overall architecture of an RFID reader system according to embodiments.

FIG. 8 is a block diagram illustrating an overall architecture of an RFID system 800 according to embodiments. It will be appreciated that system 800 is considered subdivided into modules or components. Each of these modules may be implemented by itself, or in combination with others. In addition, some of them may be present more than once. Other embodiments may be equivalently subdivided into different modules. It will be recognized that some aspects are parallel with what was described previously.

An RFID tag 803 is considered here as a module by itself. Tag 803 conducts a wireless communication 806 with the remainder, via the air interface 805. It is noteworthy that air interface 805 is really only a boundary, in that signals or data that pass through it are not intended to be transformed from one thing to another. Specifications as to how readers and tags are to communicate with each other, for example the Gen2 Specification, also properly characterize that boundary as an air interface.

RFID system 800 includes one or more reader antennas 810, and an RF Front End 820 for interfacing with antenna(s) 810. These can be made as described above. In addition, Front End 820 typically includes analog components.

System 800 also includes a Signal Processing module 830. In this embodiment, module 830 exchanges waveforms with Front End 820, such as I and Q waveform pairs. In some embodiments, signal processing module 830 is implemented by itself in an FPGA.

System 800 also includes a Physical Driver module 840, which is also known as a Data Link. In this embodiment, module 840 exchanges bits with module 830. Data Link 840 can be the stage associated with data framing. In one embodiment, module 840 is implemented by a Digital Signal Processor.

System 800 additionally includes a Media Access Control module 850, which is also known as a MAC layer. In this embodiment, module 850 exchanges packets of bits with module 840. MAC layer 850 can be the stage for making decisions for sharing the medium of wireless communication, which in this case is the air interface. Sharing can be between reader system 800 and tags, or between system 800 with another reader, or between tags, or a combination. In one embodiment, module 850 is implemented by a Digital Signal Processor. In some embodiments, many of the components of modules 820, 830, 840 and 850 can be implemented in one or more Integrated Circuit (IC) chips.

System 800 moreover includes an Application Programming Library module 860. This can include Application Programming Interfaces (APIs), other objects, etc.

All of the functionalities in system 800 can be supported by one or more processors. One of these processors can be considered a host processor. Such a host processor might include a Host Operating System (OS) and/or Central Processing Unit (CPU) 870. In some embodiments, the processor is not considered as a separate module, but one that includes some of the above-mentioned modules of system 800.

A user interface 880 may be coupled to library 860, for accessing the APIs. User interface 880 can be manual, automatic, or both. It can be supported by the host processor mentioned above, or a separate processor, etc.

It will be observed that the modules of system 800 form a chain. Adjacent modules in the chain can be coupled by the appropriate instrumentalities for exchanging signals. These instrumentalities include conductors, buses, interfaces, and so on. These instrumentalities can be local, e.g., to connect modules that are physically close to each other, or over a network, for remote communication.

The chain is used in opposite directions for receiving and transmitting. In a receiving mode, wireless waves are received by antenna(s) 810 as signals, which are in turn processed successively by the various modules in the chain. Processing can terminate in any one of the modules. In a transmitting mode, initiation can be in any one of these modules. Ultimately, signals are routed internally, for antenna(s) 810 to transmit as wireless waves.

The architecture of system 800 is presented for purposes of explanation, and not of limitation. Its particular subdivision into modules need not be followed for creating embodiments. Furthermore, the features of the present disclosure can be performed either within a single one of the modules, or by a combination of them.

Figure 9:
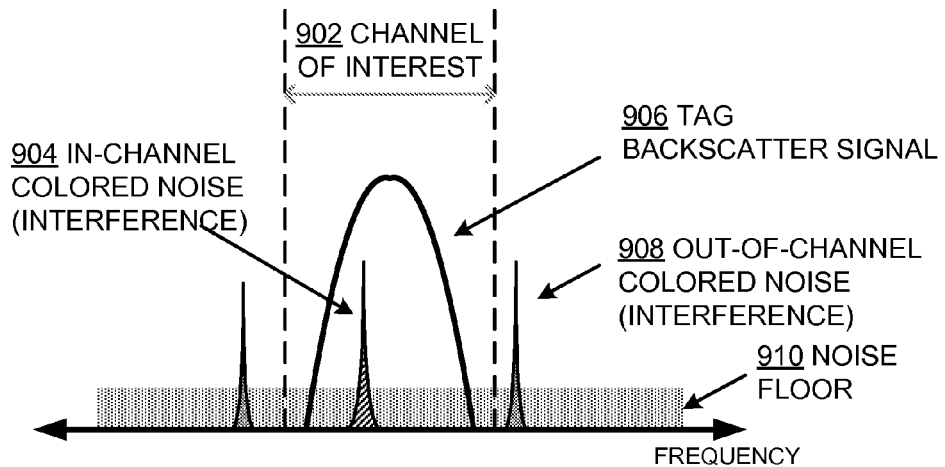
FIG. 9 illustrates an example spectrum received by a reader including in-channel colored noise, out-of-channel colored noise, and the broadband (white) thermal noise floor, as well as the effects of conventional reader receive filters that fail to attenuate the in-channel colored noise.
Figure 9:
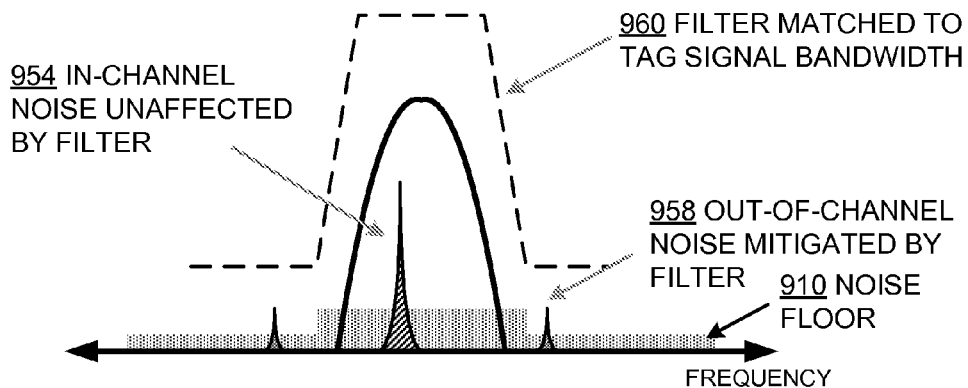

FIG. 9 illustrates an example reader receiver input that includes in-channel colored noise (interference) and an example output of conventional reader filters that typically fail to remove the in-channel colored noise.

As discussed previously, colored noise can substantially degrade decoding noise margin and, therefore, the receive performance of an RFID reader. One source of such colored noise is fluorescent lights, as described previously. Prior solutions to fluorescent-light-induced noise have included replacing the lights with incandescent or Light Emitting Diode (LED) lighting, reorienting reader antennas away from the fluorescent lights, or choosing the tag reply frequencies to avoid the interference. Other colored noise sources include electrical equipment such as electric motors and other RF transmitters that cannot be easily mitigated.

Diagram 900 of FIG. 9 shows an example spectrum at the input of a reader receiver. Within channel-of-interest 902 are tag backscatter signal 906 and in-channel colored-noise signal 904. Outside the channel-of-interest is colored noise signal 908. The diagram also shows background noise floor 910, which is typically Additive White Gaussian Noise (AWGN). AWGN comes from many natural sources such as thermal vibrations in antennas and in the reader's RF electronics.

Diagram 950 illustrates the spectrum shown in diagram 900 after the received signal has been treated by conventional reader-receiver matched filtering. As shown in diagram 950, conventional filters may suppress or reduce significantly the out-of-channel noise components 958, but not the in-channel noise components such as colored noise component 954. They also cannot compensate for time variant distortion, such as inter-symbol-interference (ISI), introduced by the channel or the reader analog front-end (AFE).

Figure 10:
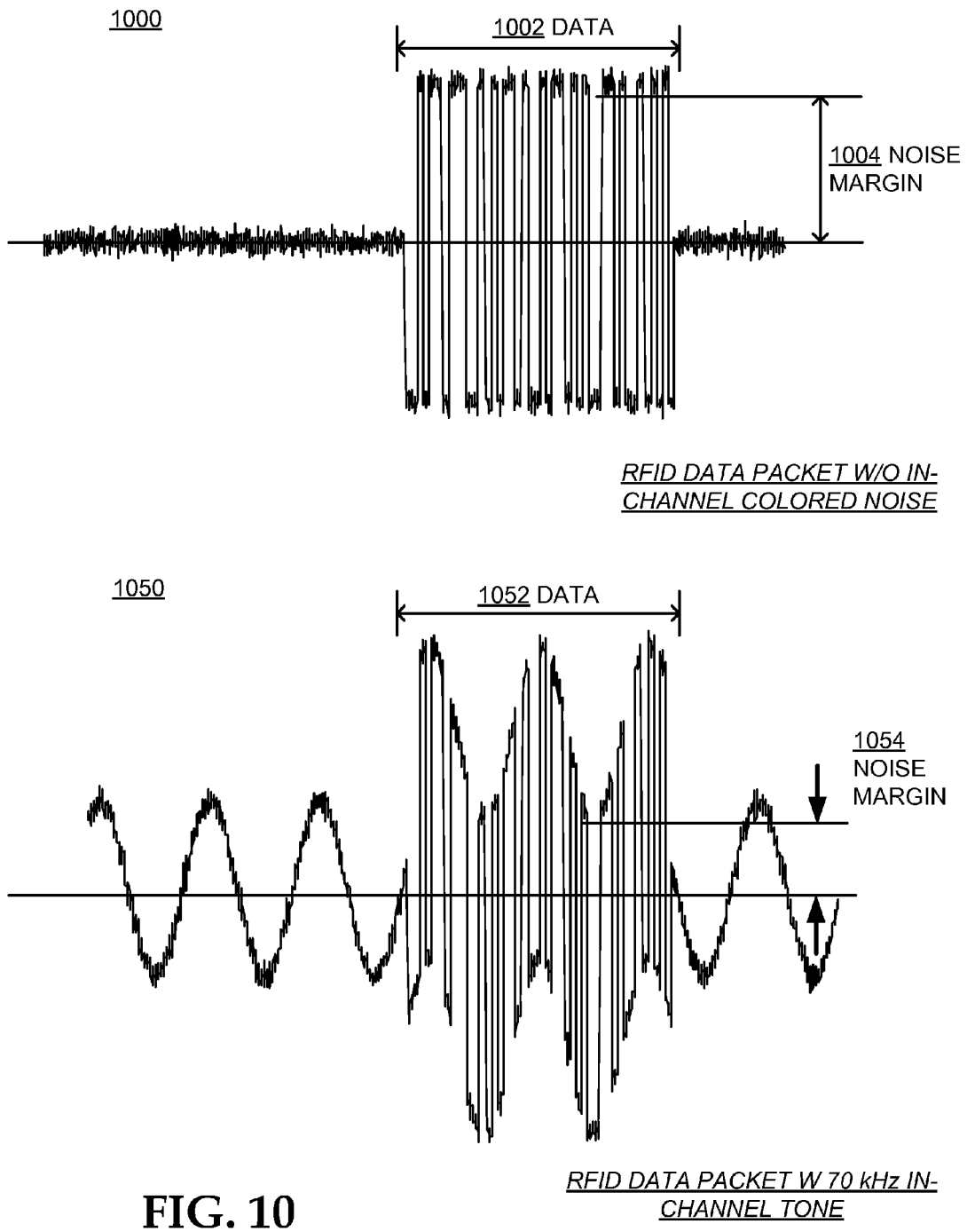
FIG. 10 illustrates an example RFID tag data packet without in-channel colored noise, and another example RFID packet superimposed on a 70 kHz in-channel tone as might be caused by interfering fluorescent lights.

FIG. 10 illustrates an example time-domain RFID tag data packet without colored noise, and another example time-domain RFID tag data packet with a 70 kHz in-channel tone such as might be caused by fluorescent lights.

Diagram 1000 of FIG. 10 illustrates an FMO-modulated tag-backscatter data packet formed according to the UHF Gen2 specification, with AWGN but without appreciable colored noise. As shown in the diagram, data symbols 1002 are much larger than the thermal noise floor, providing a noise margin 1004 that allows the reader to accurately demodulate the data symbols.

Diagram 1050 of FIG. 10 illustrates an FMO-modulated tag-backscatter data packet formed according to the UHF Gen2 specification, with AWGN and colored noise. The result is a significant reduction in noise margin, which degrades the reader's ability to accurately demodulate the data symbols.

As mentioned previously, embodiments are directed to RFID readers and reader systems mitigating colored noise through adaptive filters, and training the readers by means of data transmitted by the tags. Embodiments additionally include programs, and methods of operation of the programs. A program is generally defined as a group of steps or operations leading to a desired result, due to the nature of the elements in the steps and their sequence. A program is usually advantageously implemented as a sequence of steps or operations for a processor, such as the processors described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions of a program made according to the embodiments. A storage medium according to the embodiments is a computer-readable medium, such as a memory, and is read by a processor of the type mentioned above. If a memory, it can be implemented in a number of ways, such as Read Only Memory (ROM), Random Access Memory (RAM), etc., some of which are volatile and some non-volatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be viewed in terms of various interconnected distinct software modules.

This detailed description is presented also in terms of flowcharts, algorithms, and symbolic representations of operations on data bits on and/or within at least one medium that allows computational operations, such as a computer with memory. Indeed, such descriptions and representations are the type of convenient labels used by those skilled in programming and/or the data-processing arts to effectively convey the substance of their work to others skilled in the art. A person skilled in the art of programming may use these descriptions to readily generate specific instructions for implementing a program according to the present disclosure.

An RFID reader according to some embodiments includes an antenna, a transmitter coupled to the antenna, and a receiver coupled to the antenna, the receiver including an adaptive filter. The adaptive filter may be a linear equalizer, a linear-predictive canceller, or a decision-feedback equalizer. The adaptive filter may estimate a colored noise component of a received signal, the estimate being based on a difference between a desired signal and a portion of the received signal, and may mitigate the colored noise by removing the colored noise estimate from the received signal.

The desired signal may include training data, packet data, decision data, or in-channel energy. The colored noise estimate may be derived from correlated noise components and removed by subtracting. The adaptive filter may also include an adaptation controller configured to adapt a filtering module of the adaptive filter.

According to other embodiments, the adaptation controller may be further configured to select the portion of the received signal to be used for adaptation; select a quality metric to be used for adaptation from a demodulator waveform or a decision error; and implement an adaptive least-mean-squares algorithm or a recursive least-squares algorithm to adapt the filter coefficients (weights). The adaptation controller may also adjust a convergence behavior of the adaptive algorithm, and may adapt the filtering module in a continuous manner or during a predefined period. The predefined period may be a time interval when no tag signal is present.

Alternatively, the predefined period may be a pilot-tone time and/or a preamble time according to the Gen2 Specification. The pilot tone and the preamble may form at least a portion of the received signal.

According to further embodiments, the filtering module of the adaptive filter may be adapted by the reader providing a proxy tag signal in place of at least a portion of the received signal during an RF power ramp, a frequency hop interval, or during a regular communication between the tag and the reader. The proxy tag signal may be a digital signal that is combined with digitized waveforms in the reader's receiver, or an analog signal that is combined with analog waveforms in the reader's receiver. The proxy tag signal may also be combined with channel impairments before being provided to the filtering module. Moreover, the reader may also include a processor configured to instruct the tag to reply with an alternative preamble to improve the colored noise estimate.

Embodiments also include methods. Some are methods of operation of an RFID reader or an RFID reader system. Others are methods for controlling an RFID reader or an RFID reader system.

These methods can be implemented in any number of ways, including the ways described in this document. One such way is by machine operations, of devices of the type described in this document.

Another optional way is for one or more of the individual operations of the methods to be performed in conjunction with one or more human operators performing some of them. These human operators need not be collocated with each other, but each can be only with a machine that performs a portion of the program.

Figure 11:
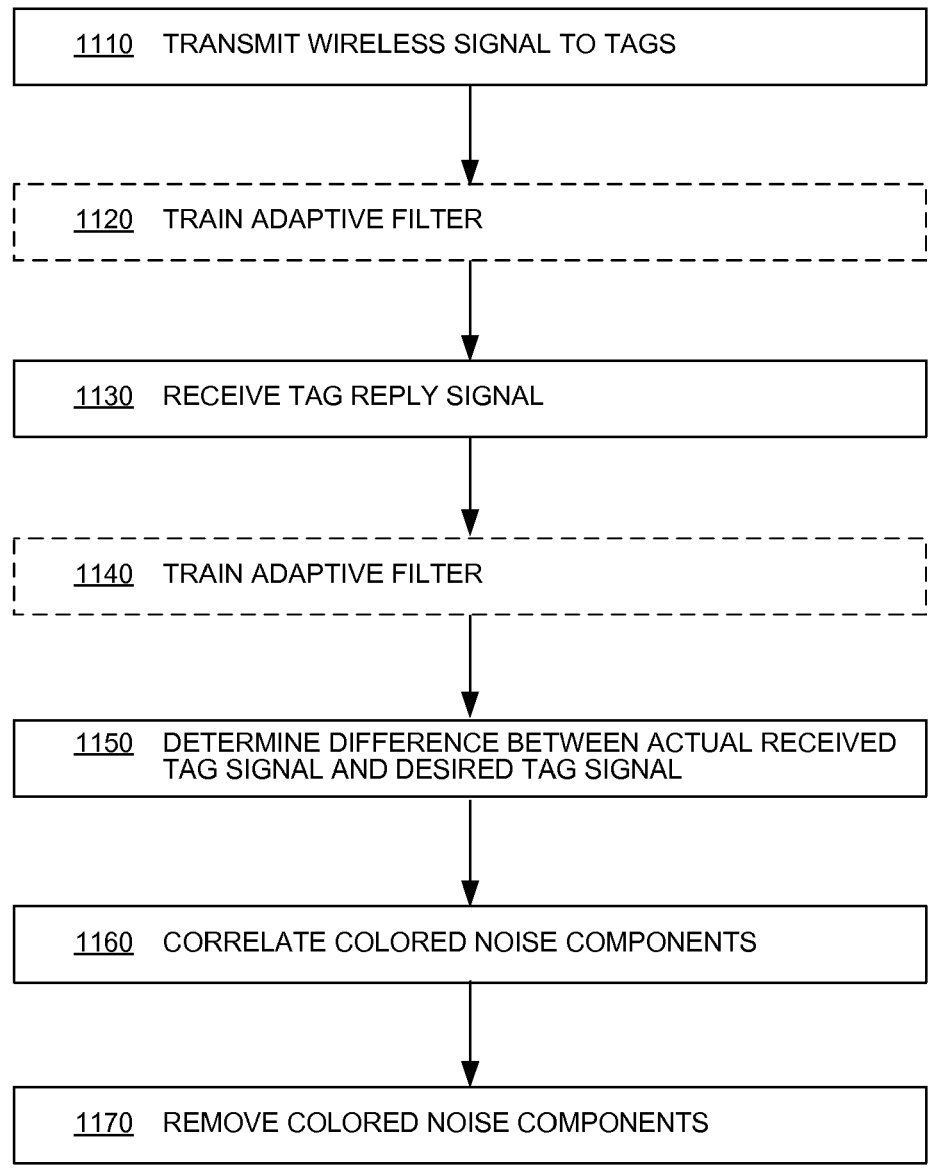
FIG. 11 is a flowchart for a process of mitigating colored noise in the receiver of an RFID reader.

FIG. 11 is a flowchart for a process 1100 of mitigating colored noise in an RFID reader.

Reader operations generally include transmitting a wireless signal to a tag (or to a population of tags) 1110, receiving a reply signal 1130, determining a difference between the reply signal and a desired signal 1150, correlating colored noise components based on the difference 1160, and removing the colored noise components from the current and/or future received signals 1170.

Adaptive filters employed in readers may include linear-predictive cancellers, linear equalizers, or decision-feedback equalizers. These filters may be trained at opportune times in the reader receive operations. For example, as illustrated in optional training intervals 1120 and 1140, training can occur when the tag reply signal is not present, such as during the Gen2 T1 interval, or when the tag reply signal is present, such as when the reader is receiving a tag's pilot tone, preamble, or identifying data. Alternatively, the filters may be trained by the reader providing a proxy tag signal in place of a portion or the entirety of the tag reply signal. The training may be performed intermittently or continuously.

The operations included in process 1100 are for illustration purposes only. Mitigating colored noise in an RFID system may be implemented by similar processes with fewer or additional steps, as well as in a different order of operations using the principles described herein.

Figure 12:
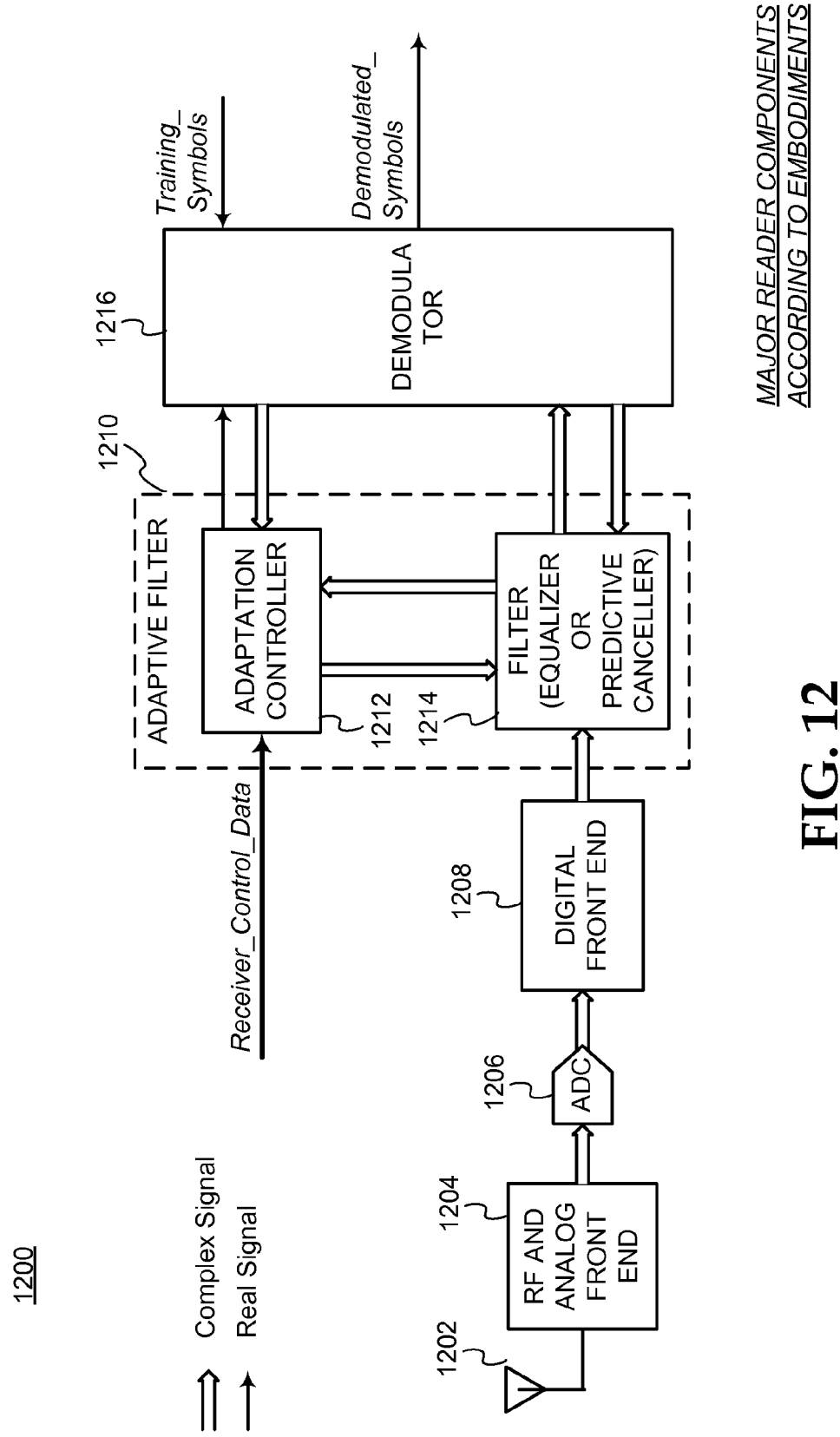
FIG. 12 illustrates the major components of an RFID reader for mitigating colored noise in a receive channel-of-interest according to embodiments.

FIG. 12 illustrates the major components of an RFID reader mitigating colored noise according to embodiments.

The RF AFE 1204 receives reply signals from tags, plus noise, via antenna 1202. The RF AFE 1204 may also include analog filters for removing out-of-channel noise. Analog-to-digital converter (ADC) 1206 converts the analog signal to digital and provides it to digital front end 1208. Digital front end 1208 provides initial conditioning such as gain control and decimation filtering. The signal is then provided to a filtering module 1214 of adaptive filter 1210, which may be a linear predictive canceller, a linear equalizer, or a decision-feedback equalizer (collectively known as predictive cancellers or equalizers). Filtering module 1214 is controlled by adaptation controller 1212, which controls aspects of filter adaptation such as adaptation time, adaptation algorithm, error source, convergence behavior, etc. The adaptively filtered signal is then provided to demodulator 1216, which demodulates tag-reply symbols to provide to other circuits of the reader. Demodulator 1216 also receives training symbols from other circuits of the reader and may provide feedback to the adaptation controller 1212 and/or the filtering module 1214 of the adaptive filter 1210.

Adaptation controller 1212 controls, as mentioned above, various aspects of filtering module 1214. Specifically, these aspects may include a time of the filtering; selecting the training data for adaptation; selecting the error source for adaptation; choosing the adaptive algorithm; and controlling the convergence behavior of the algorithm.

An RFID reader employing adaptive filters to mitigate correlated noise according to embodiments may employ estimation/prediction of the correlated noise in the form of adaptive cancellation or adaptive equalization. The colored noise is attenuated by estimating the correlated noise components and subtracting them from the tag-reply signal. Such an RFID reader may adapt its receiver filter(s) continuously or during one or more discrete time periods; in either case the filtering is facilitated by the reader having a priori knowledge of whether and how a tag should reply. The discrete time periods can be: During the Gen2 T1 interval when a tag-reply signal is not present; when the tag is sending a (known) pilot tone and/or preamble; and when the tag is sending identifying data.

The RFID reader may optionally instruct the tags to use alternative preambles to facilitate filter convergence. Alternate tag preambles may be better suited to filter training than standard preambles or identifying tag data.

The RFID reader may also sum a known training sequence into its receiver. A proxy tag signal is a known training sequence generated and injected internal to the reader. The reader may sum a digital proxy signal with the ADC 1206 output data, or an analog proxy signal into AFE 1204. The proxy tag signal may be combined with channel impairments at the summing node. For colored noise whose statistics are either time invariant or slowly varying, using a proxy signal can aid filter convergence by providing a coarse initial solution for the adaptive filter coefficients.

One example use for a tag proxy signal includes the reader first inventorying tags whose replies have high signal-tonoise ratio (SNR), where little or no whitening (i.e. colored-noise removal) is required. During these times of high SNR, the reader may inject a proxy signal into the receiver to provide a coarse initial filter solution. Then, during a second time period, the reader may look for those remaining tags whose replies have low SNR, both fine-tuning the filter solution and removing the colored noise from these low-SNR tag-reply signals. In this fashion the proxy signal aids in reading those tags whose reply SNR is low due to colored noise.

Figure 13:
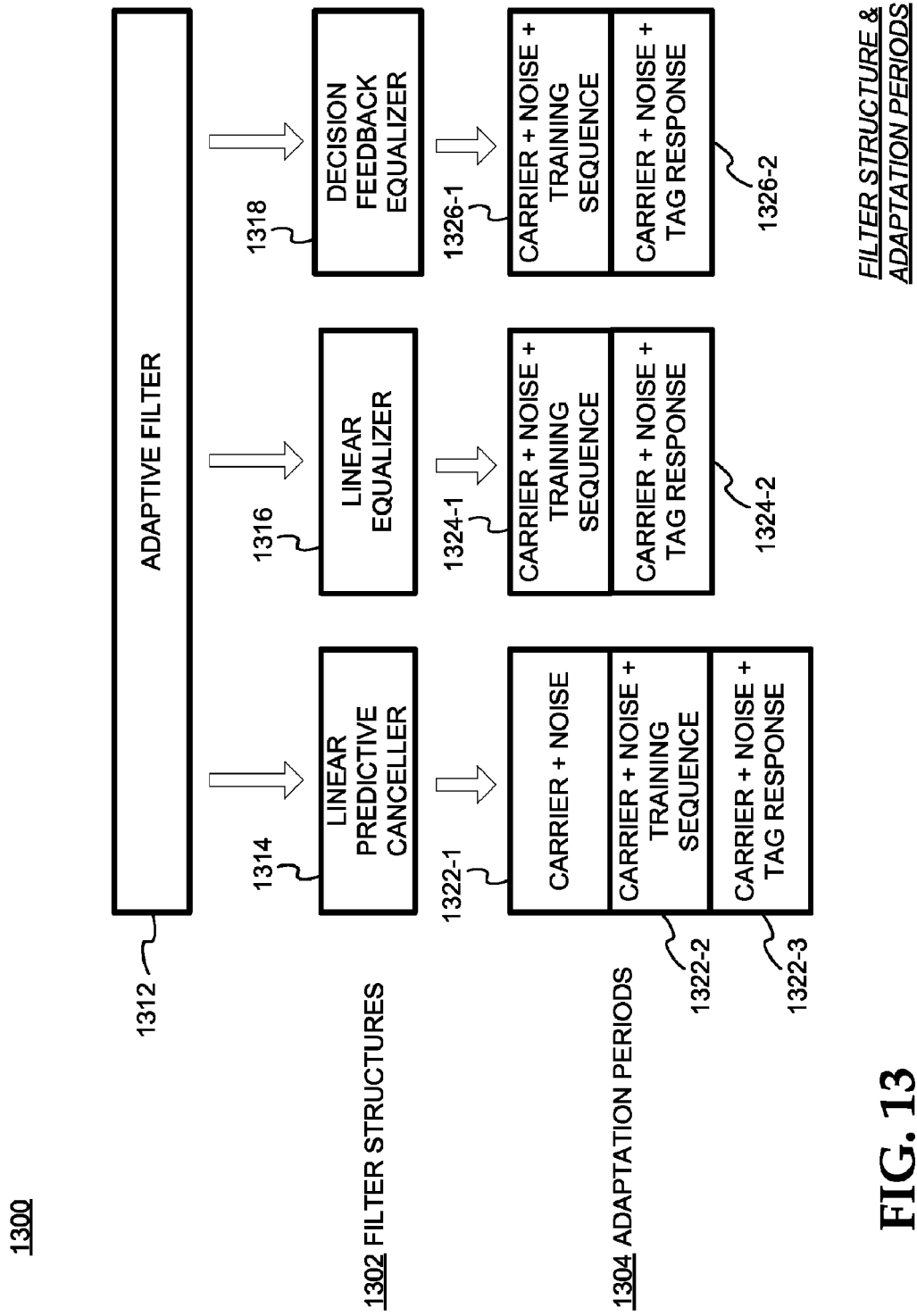
FIG. 13 illustrates three possible adaptive filter structures and corresponding possible adaptation periods for an RFID reader according to embodiments.

FIG. 13 illustrates possible filter structures and adaptation periods for an RFID reader adaptive filter according to embodiments.

An adaptive filter is a filter that self-adjusts its transfer function according to an optimization algorithm. Adaptive filters adapt their filter coefficients (weights) based on the input signal and/or feedback signals, typically by means of digital-signal processing. Adaptive filters may be contrasted with non-adaptive filters which have static filter coefficients. Adaptive filters are beneficial when one or more parameters of the filtering operation (for example, the statistics of a noise signal) are not known a priori. In such situations the adaptive filter dynamically refines its filter coefficients and, thereby, its ability to mitigate incoming colored noise.

Generally, the adaptation process involves minimizing a cost function as a criterion for optimizing the filter performance. The adaptation algorithms determine how best to modify the filter coefficients to minimize the cost function. Adaptive filters may use past samples of the received signal and/or estimated values of future signals for their adaptation.

As shown in diagram 1300, adaptive filter 1312 may include several different types of filter structures 1302 (i.e., filtering module 1214 of FIG. 12). In a reader according to embodiments, these structures may include a linear-predictive canceller 1314, a linear equalizer 1316, or a decision-feedback equalizer 1318.

Linear-predictive canceller 1314 estimates the current value of a signal as a linear function of previous samples of the signal. Adaptation periods 1304 in a linear-predictive canceller 1314 include period 1322-1 when the filter may perform a coarse adaptation while receiving an RF carrier and noise; period 1322-2 when the filter may perform a fine adaptation while receiving an RF carrier and noise plus a training sequence; and period 1322-3 when the filter may also perform a fine adaptation while receiving an RF carrier and noise plus a tag reply signal.

Linear equalizer 1316 is a linear transversal filter that may operate at the symbol rate (T-spaced equalizer) or at a multiple of the symbol rate (fractionally spaced equalizer). The linear equalizer may be optimized to eliminate the error energy due to ISI (Zero-Forcing "ZF" criteria) or to minimize the combined error energy due to ISI and noise (Mean-Squared Error "MSE" criteria). The MSE linear equalizer strikes a balance between compensating signal amplitude distortion and enhancing output noise. In the presence of in-channel colored noise, the MSE linear equalizer strikes a balance between minimizing the correlated noise energy and adding ISI to the desired signal. Linear equalizer 1316 may perform coarse adaptation 1324-1 using training data when receiving the RF carrier and noise, and fine adaptation 1324-2 when receiving the RF carrier, noise, and a tag reply signal.

A decision-feedback equalizer (DFE) is a nonlinear equalizer composed of a fractionally-spaced forward filter and a symbol-spaced feedback filter. The forward filter operates on the receiver input signal while the feedback filter operates on previous decision data. The DFE may be optimized in accordance with ZF or MSE criteria. Since the decisions fed back through the feedback filter are noise-free estimates of the previous symbols, the DFE can remove postcursor ISI (ISI due to past symbols) without enhancing the output noise. The forward filter may be optimized to form the composite of a matched filter and a noise-whitening filter. The feed forward filter may introduce postcursor ISI (for example through the noise whitening process), which is subsequently cancelled by the feedback filter.

DFE 1318 contains a forward filter and a feedback filter. The forward filter is similar to the linear equalizer described above. The feedback filter contains a tapped delay line whose inputs are the decisions made on the signal by the forward filter. A DFE can adjust its forward and feedback filter coefficients simultaneously. The equalizer then outputs a weighted sum of the values in the forward and feedback delay lines, and updates its filter coefficients to prepare for the next symbol period. DFE 1318 may employ two adaptation periods: 1326-1 when the input is an RF carrier and noise plus a training sequence, and 1326-2 when the input is an RF carrier plus noise and a tag reply signal.

Figure 14:
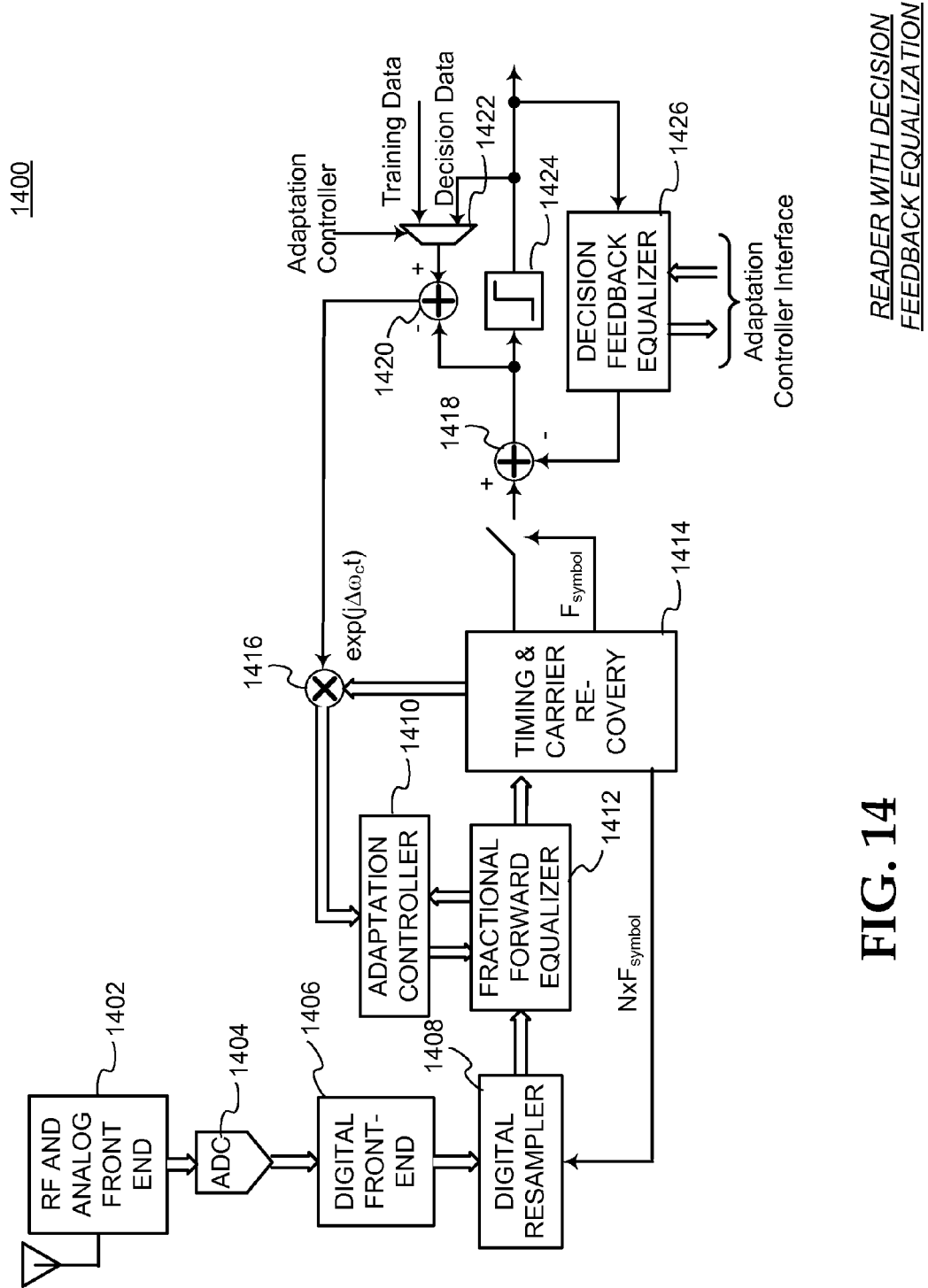
FIG. 14 illustrates the major components of an RFID reader employing decision-feedback equalization for mitigating colored noise according to embodiments.

FIG. 14 illustrates diagram 1400 of the major components of an RFID reader employing a DFE for mitigating colored noise according to embodiments.

As discussed in FIG. 12, the signal received by the RF and AFE 1402 is converted to a digital signal by ADC 1404 and then provided to digital resampler 1408 by digital front end 1406, which may include filters for attenuating out-of-channel noise. The samples are then provided to fractional forward equalizer 1412 (DFE forward filter) controlled by adaptation controller 1410.

Fractional forward equalizer 1412 feeds timing and carrier-recovery module 1414 which provides an input to a summing node 1418, as well as sampling-rate information to digital resampler 1408. Timing and carrier recovery module 1414 also provides feedback to adaptation controller 1410 through mixer 1416, which phase adjusts (rotates) the error by the carrier offset.

Summing node 1418 also receives feedback from decision-feedback equalizer 1426 (DFE feedback filter) and provides decision data through limiter (comparator) 1424. The decision data along with training data are provided to multiplexer 1422, which is controlled by adaptation controller 1410. An output of multiplexer 1422 is provided to summing node 1420, where an output of summing node 1418 is subtracted from the multiplexer output and provided back to mixer 1416.

Fractional forward equalizer 1412 forms a whitening matched filter that removes correlated noise but introduces postcursor ISI. Decision-feedback equalizer 1426 acts to remove the postcursor ISI.

Figure 15:
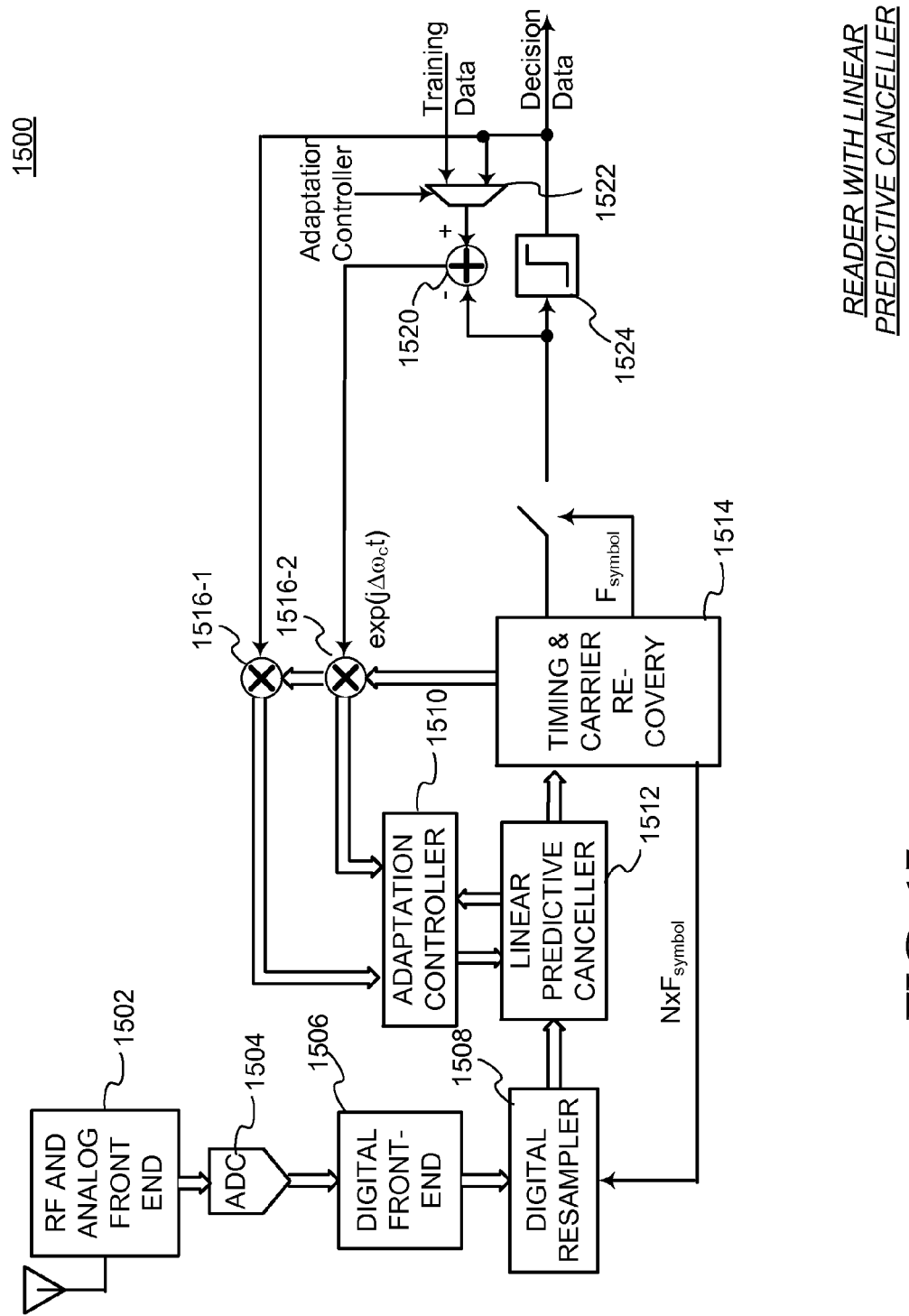
FIG. 15 illustrates the major components of an RFID reader employing linear-predictive cancellation for mitigating colored noise according to embodiments.

FIG. 15 illustrates diagram 1500 of the major components of an RFID reader employing linear-predictive cancellation for mitigating colored noise according to embodiments.

Circuits 1502 through 1508 of the linear-predictive canceller (also known as a linear predictor) shown in diagram 1500 are similar to likewise numbered circuits in FIG. 14. Digital resampler 1508, which receives its sampling-rate information from timing and carrier-recovery circuit 1514, provides samples to linear-predictive canceller 1512 controlled by adaptation controller 1510.

The linear-predictive canceller 1512 employs forward prediction to estimate the colored noise; it then subtracts the estimate from the received signal. An output of the timing and carrier-recovery circuit 1514 is provided to limiter (comparator) 1524 to provide decision data to other circuits of the reader. The output of the timing and carrier-recovery circuit 1514 is also subtracted at summing node 1520 from an output of multiplexer 1522, which multiplexes (chooses) the training data or decision data as instructed by adaptation controller 1510.

The output of the summing node 1520 (the error signal) is provided to mixer 1516-2 along with an input from timing and carrier-recovery circuit 1514; mixer 1516-2 phase adjusts (rotates) the error by the carrier offset. The output of mixer 1516-2 is provided to adaptation controller 1510. It is also provided to mixer 1516-1, where it is mixed with the decision data and the result is provided to adaptation controller 1510.

It should be noted that the example components of the decision-feedback equalizer and linear-predictive cancellers in FIGS. 14 and 15, as well as the linear equalizer in FIG. 17 below, are provided solely for illustration purposes and do not constitute a limitation on embodiments. Adaptive filters for mitigating colored noise in RFID readers may be implemented using fewer or additional components than those shown herein, such as, for example, filters with fewer or additional taps. Furthermore, other component types such as combinations of the examples described herein may also be used to mitigate colored noise. In that spirit, example circuits for a linear-predictive cancellation filter are shown in FIG. 16, and example circuits for a linear-equalization filter are shown in FIG. 18.

Figure 16:
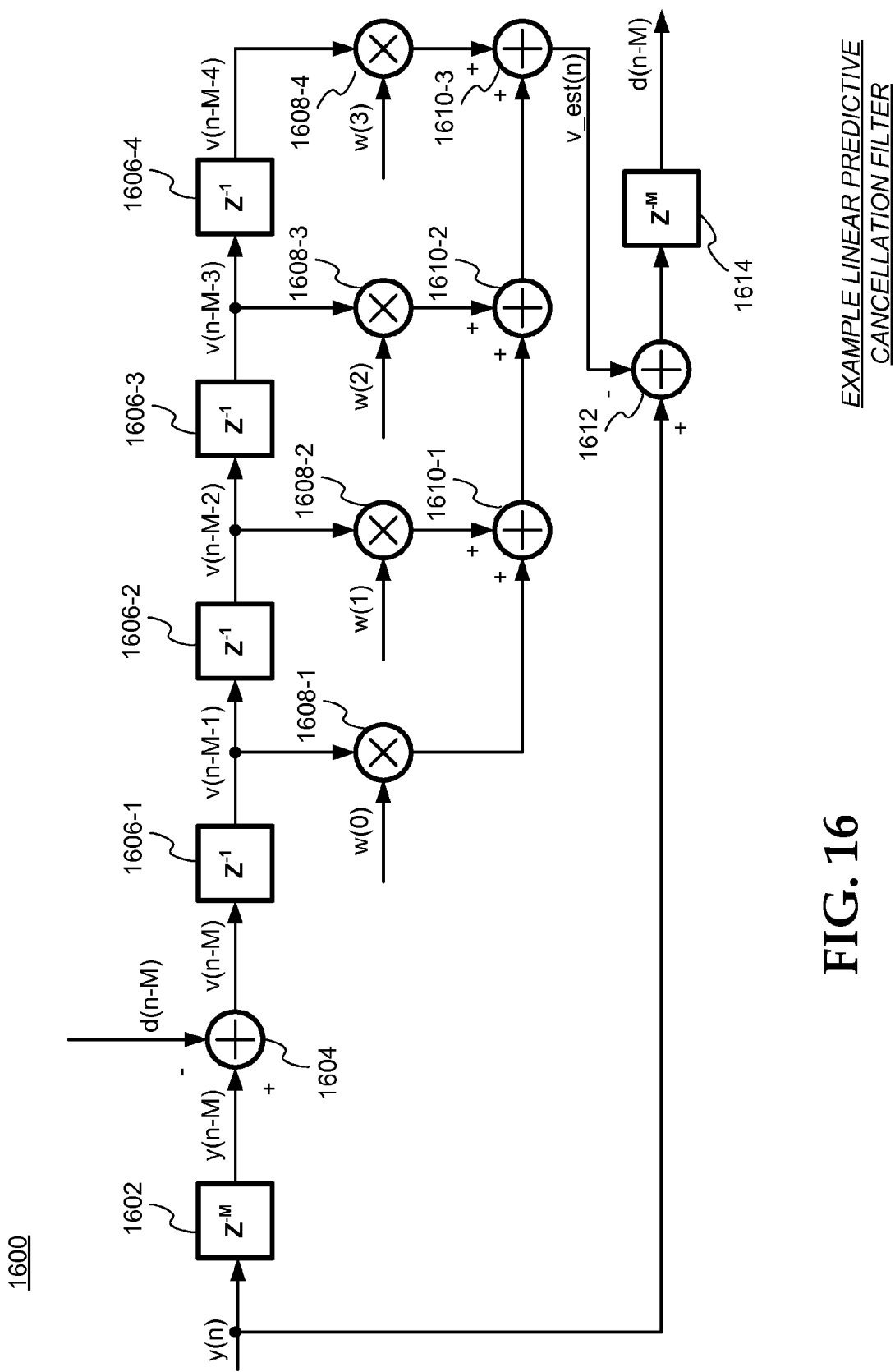
FIG. 16 illustrates an example linear-predictive cancellation filter according to embodiments.

FIG. 16 illustrates an example circuit for a 4-tap linear-predictive cancellation filter, as might be implemented for the linear-predictive canceller 1512 in FIG. 15.

The predictive-cancellation filter shown in diagram 1600 employs previous samples of the incoming noise signal to estimate a current sample. In this example d(n) is the decision data (the desired data), v(n) is the colored noise, and y(n) is the incoming signal which comprises d(n) plus the colored noise v(n). The filter may be adapted by subtracting delayed estimates of the desired signal d(n−M) from a delayed incoming signal y(n−M).

Delayed incoming signal y(n−M) is derived at node 1602 from y(n). Desired signal d(n−M) is subtracted from y(n−M) at summing node 1604, thereby providing v(n−M). Four delayed samples v(n−M−1), v(n−M−2), v(n−M−3), and v(n−M−4) are derived at delay nodes 1606-1 through 1606-4. These noise samples are weighted at mixers (multipliers) 1608-1 through 1608-4 with weight (coefficient) factors w(0) through w(3). The weighted noise samples are summed at summing nodes 1610-1 through 1610-3, producing an estimate of the colored noise v_est(n). Weights w(0) through w(3) are computed by the adaptation controller 1510 of the adaptive filter 1500. This colored noise estimate v_est(n) is subtracted from y(n) at summing node 1612, followed by a delay due to demodulator signal processing introduced at delay node 1614. The output of delay node 1614 is d(n−M).

Figure 17:
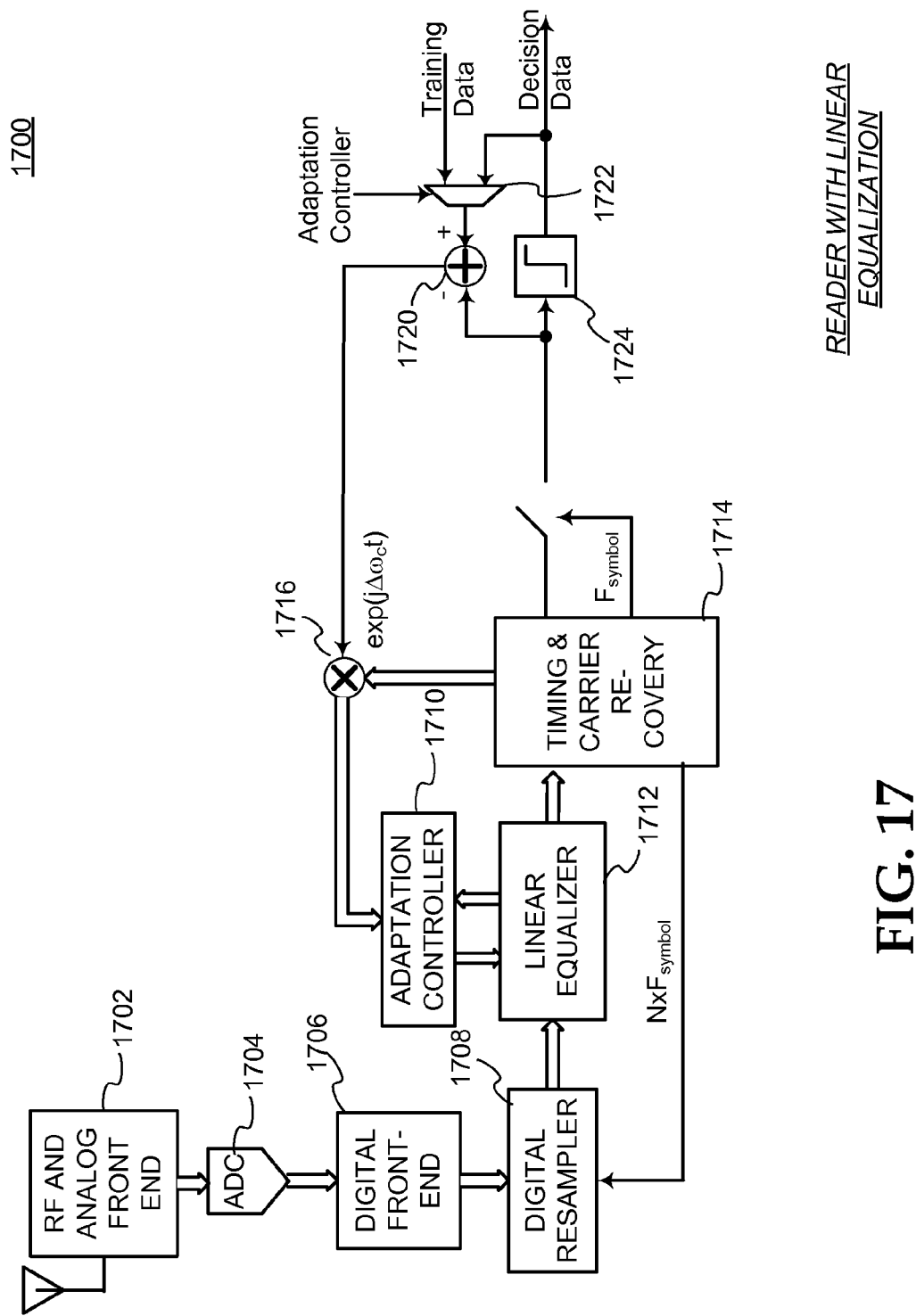
FIG. 17 illustrates the major components of an RFID reader employing a linear equalizer for mitigating colored noise according to embodiments.
Figure 18:
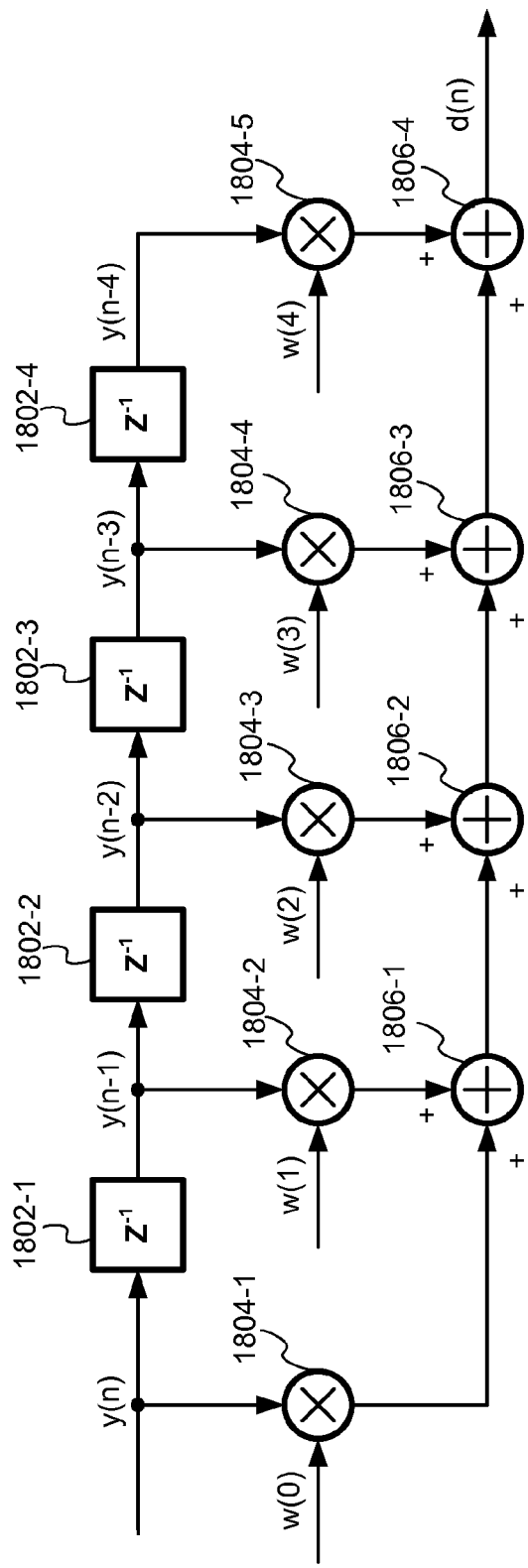
FIG. 18 illustrates an example linear-equalization filter according to embodiments.

FIG. 17 illustrates diagram 1700 of the major components of an RFID reader employing linear equalization for mitigating colored noise according to embodiments.

Circuits 1702 through 1708 of the linear equalizer shown in diagram 1700 are similar to likewise numbered circuits in diagrams 1400 and 1500 of FIGS. 14 and 15. Digital resampler 1708 receives input data from digital front end 1706, sampling-rate information from timing and carrier-recovery circuit 1714, and provides samples to linear equalizer 1712 controlled by adaptation controller 1710.

In this example, linear equalizer 1712 receives a predefined number of input samples before producing an output sample and updating its filter coefficients (weights). An output of the timing and carrier-recovery circuit 1714 is provided to limiter (comparator) 1724 to provide decision data to other circuits of the reader. The same output from timing and carrier-recovery circuit 1714 is also subtracted at summing node 1720 from an output of multiplexer 1722, which multiplexes (chooses) the training data or decision data as instructed by adaptation controller 1710.

The output of the summing node 1720 (the error signal) is provided to mixer (multiplier) 1716, which also receives an input from timing and carrier-recovery circuit 1714; mixer 1716 phase adjusts (rotates) the error signal by the carrier offset. The output of mixer 1716 is provided to adaptation controller 1710.

FIG. 18 illustrates an example circuit for a 5-tap linear-equalization filter, as might be implemented for the linear equalizer 1712 in FIG. 17.

The linear-equalization filter shown in diagram 1800 convolves the received signal y(n), which includes colored noise, with the time-varying filter coefficients (weights) w(M), yielding the desired signal d(n). The filter coefficients w(M) are computed by the adaptation controller 1710 of the adaptive filter 1700.

As shown in diagram 1800, samples of the received signal y(n) are delayed by delay nodes 1802-1 through 1802-4; these delayed samples are then multiplied by the time-varying coefficients w(0) through w(4) at mixers 1804-1 through 1804-5, and summed at sum nodes 1806-1 through 1806-4. The result is desired signal d(n).

Figure 19:
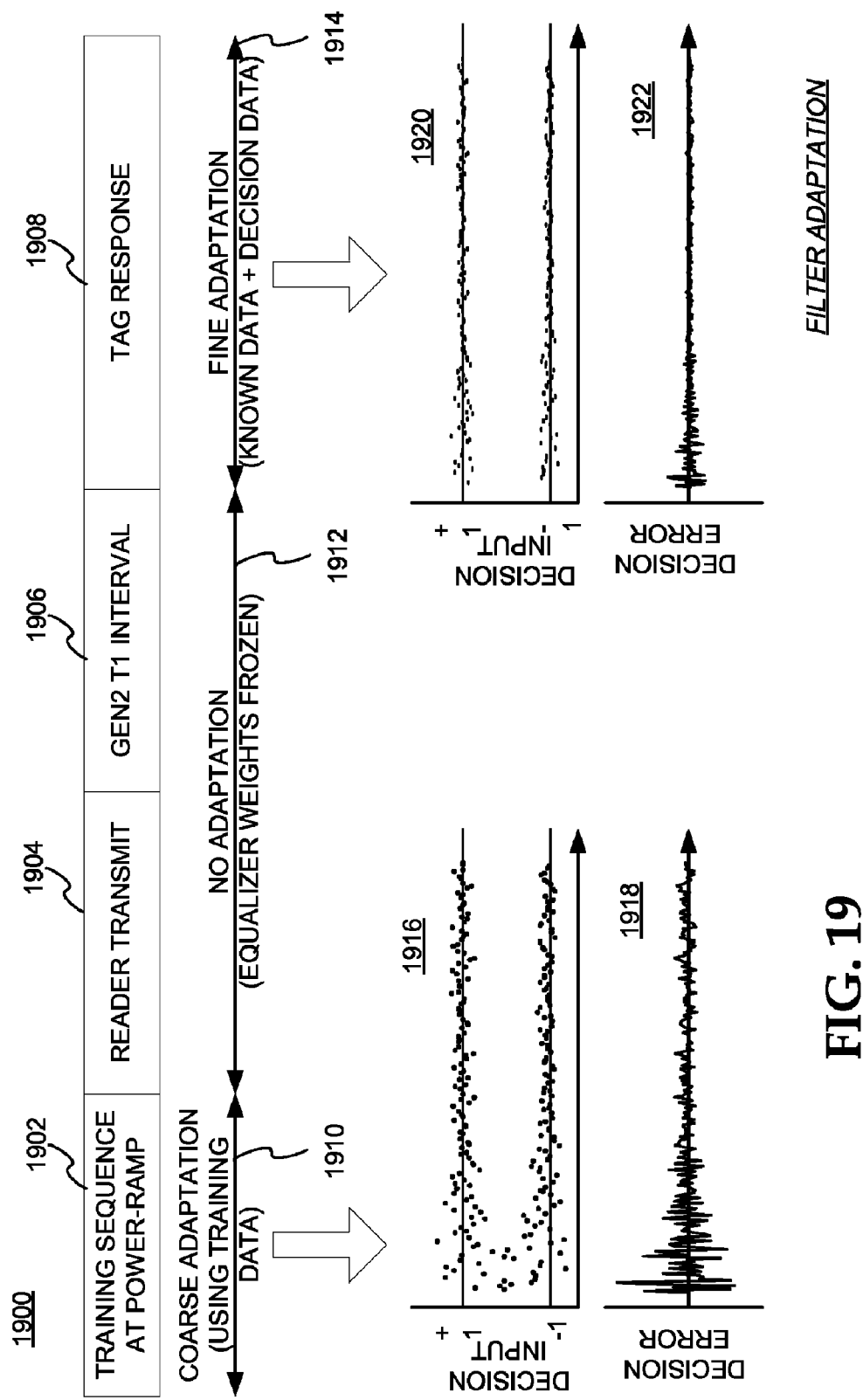
FIG. 19 illustrates equalizer adaptation periods and example waveforms.

FIG. 19 illustrates equalizer adaptation periods and example waveforms.

As discussed previously, adaptive filters require training samples to adapt. In diagram 1900, the filter may perform a coarse adaptation during an RF power ramp or a similar training time 1902 using training data such as a proxy tag signal provided by circuits of the reader. The result of this coarse training is the decision input shown in diagram 1916 and the decision error shown in diagram 1918. In this example, no adaptation occurs during reader transmit period 1904 or Gen2 T1 interval 1906—the filter coefficients are frozen. A fine adaptation may be performed during tag response period 1908 using known data (such as a pilot tone, preamble, or tag data) and decision data. The result of this fine adaptation is the improved decision input shown in diagram 1920 and the reduced decision error shown in diagram 1922.

Figure 20:
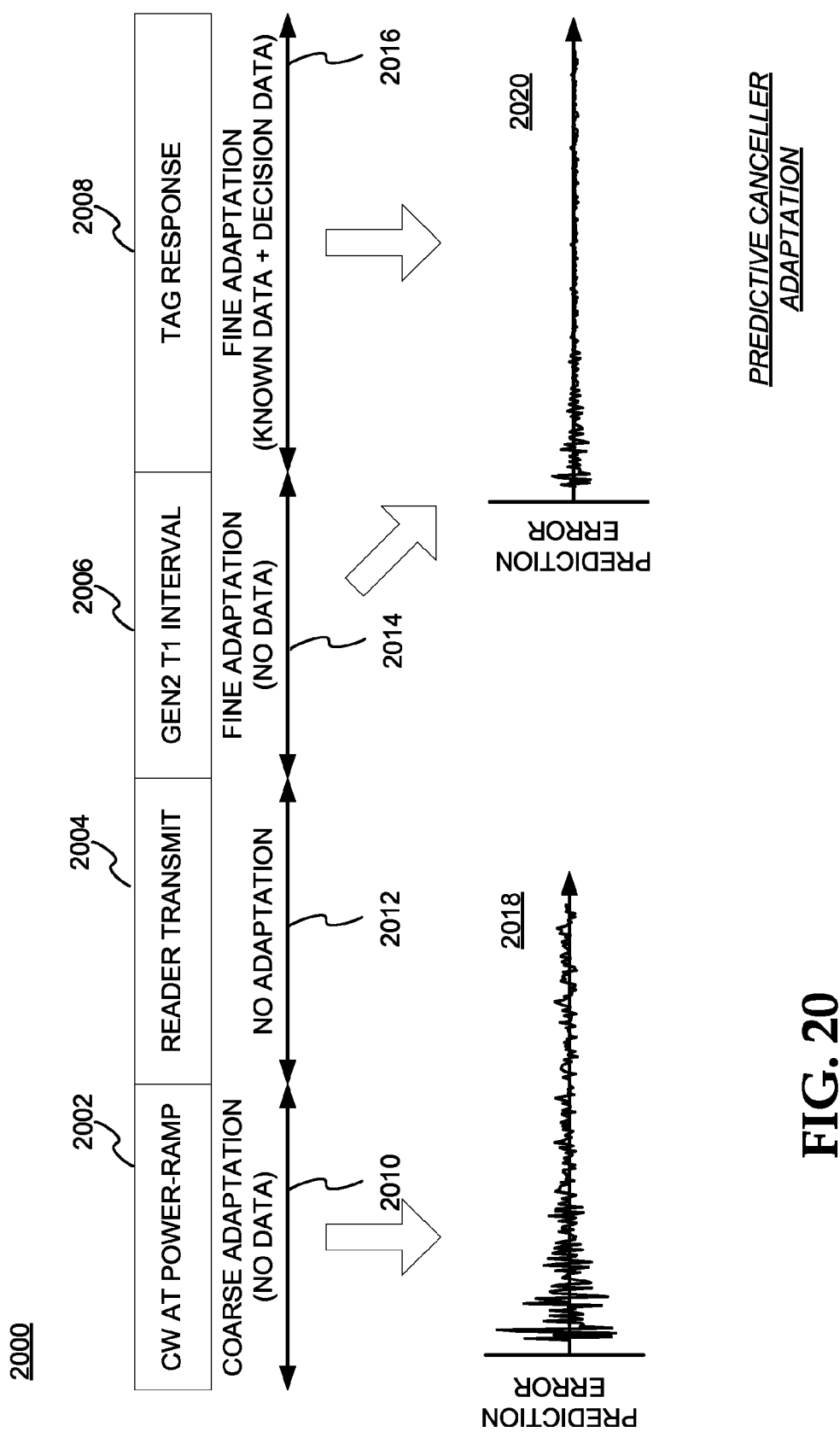
FIG. 20 illustrates predictive-cancellation adaptation periods and example waveforms.

FIG. 20 illustrates predictive canceller adaptation periods and example waveforms.

In diagram 2000, a predictive canceller may perform a coarse adaptation 2010 during an RF power ramp or a similar training time 2002 by using the reader's CW signal and minimizing the variance in the received energy. This coarse adaptation results in the initial prediction error shown in diagram 2018. In this example, no adaptation occurs during reader transmit period 2004—the filter coefficients are fixed. A fine adaptation may be performed during the Gen2 T1 interval 2006 and/or during tag response period 2008. During the Gen2 1 interval 2006, because no tag data are present, the fine adaptation 2014 may be performed using the reader's CW signal. During tag response period 2008, the fine adaptation 2016 may be performed using the tag's pilot tone, preamble, or backscattered data. The result of this fine adaptation is reduced prediction error as shown in diagram 2020.

Figure 21:
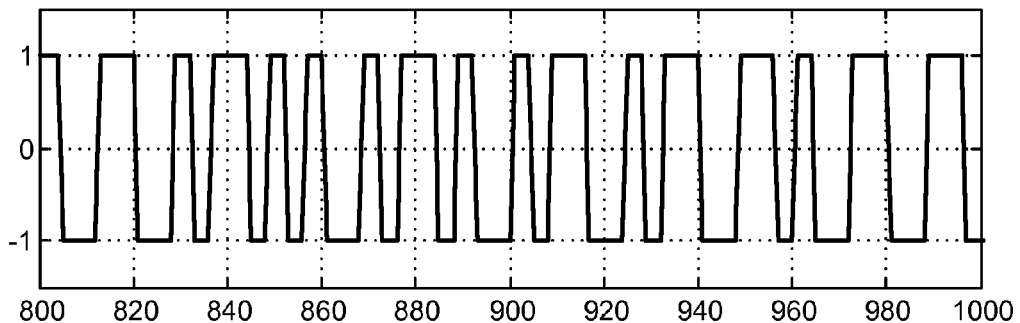
FIG. 21 illustrates a comparison of noise-free, colored-noise-corrupted, and adaptively filtered tag reply data in an RFID reader according to embodiments.
Figure 21:
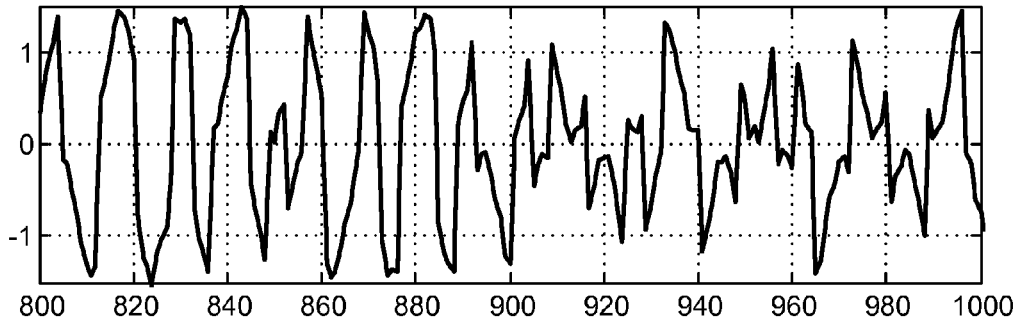
Figure 21:
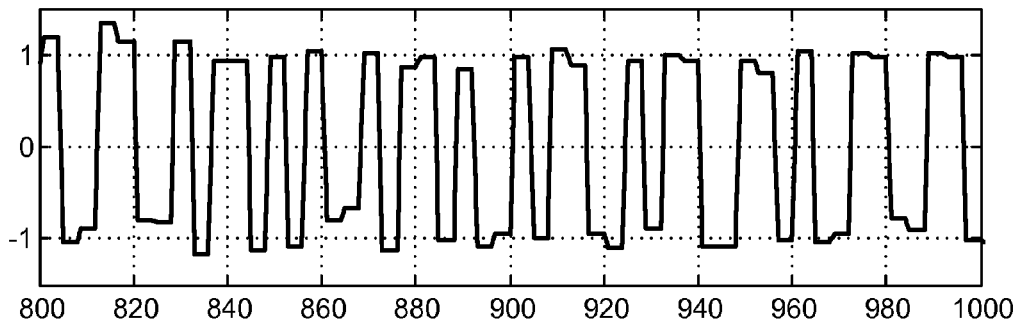

FIG. 21 is a comparison of a noise-free, noisy, and filtered tag reply signal in an RFID reader according to embodiments.

Diagram 2110 shows noise-free reply data from a tag. These data do not include any degradation due to noise. Diagram 2120 shows the effect of colored noise on the tag reply signal. In this case the noise is a simple 100 kHz tone. Without adaptive filtering, a reader will have a very difficult time demodulating the tag-reply symbols from these noisy data. Diagram 2130 illustrates the noisy waveform of diagram 2120 after filtering by a decision-feedback equalizer.

The filter significantly reverses the degradation caused by the colored noise component. To those versed in the art, the decision-feedback equalizer has "whitened" the noisy waveform.

The above-described features of a reader, including the adaptive filtering, can be implemented by a so-called utility of an RFID reader. A utility can include one or more of the above described components, operational processing blocks, an article of manufacture, etc.

Figure 22:
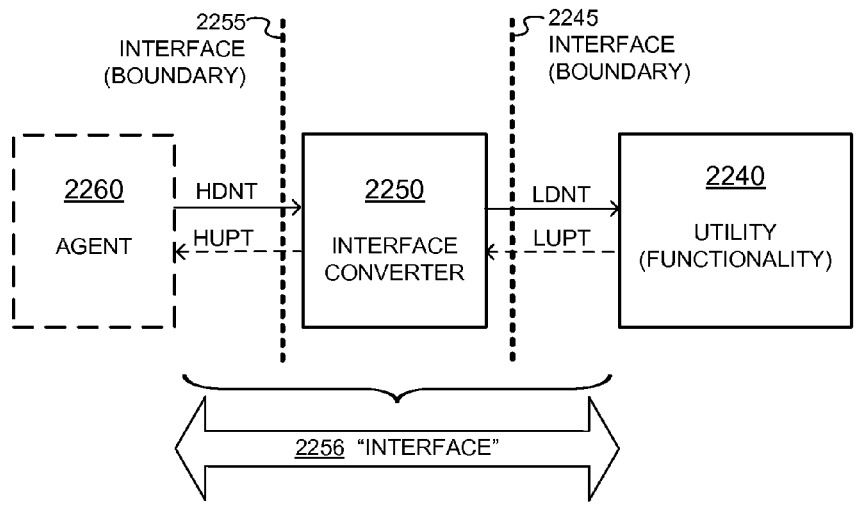
FIG. 22 is a block diagram illustrating an interface-converter architecture according to embodiments.

The invention further provides interfacing, to expose a functionality of this reader utility to an agent, as is described in more detail below. FIG. 22 is a block diagram illustrating an architecture 2200 for an interface converter according to embodiments. Architecture 2200 includes a utility 2240, as described above.

Architecture 2200 also includes an interface converter 2250 and an agent 2260. Agent 2260, interface converter 2250, and utility 2240 can be implemented in any way known in the art. For example, each can be implemented in hardware, middleware, firmware, software, or any combination thereof. In some embodiments, agent 2260 is a human. Interface converter 2250 enables agent 2260 to control utility 2240. Interface converter 2250 is so named because it performs a conversion or a change, as will be described in more detail below.

Embodiments of the present invention may include interface converter 2250, and methods of operation of interface converter 2250.

Between interface converter 2250, agent 2260, and utility 2240 there are respective boundaries 2255, 2245. Boundaries 2255, 2245 are properly called interfaces, in that they are pure boundaries, as in the above described air interface.

In addition, it is a sometimes informal usage to call the space between boundaries 2255 and 2245, which includes interface converter 2250, an "interface" 2256. Further, it is common to designate this space with a double arrow as shown, with an understanding that operations take place within the arrow. So, although "interface" 2256 is located at a boundary between agent 2260 and utility 2240, it is not itself a pure boundary. Regardless, the usage of "interface" 2256 is so common for interface converter 2250 that this document sometimes also refers to it as an interface. It is clear that embodiments of such an "interface" 2256 can be included in this invention, if they include an interface converter that converts or alters one type of transmission or data to another, as will be seen below.

Agent 2260 can be one or more layers in an architecture. For example, agent 2260 can be something that a programmer programs to. In alternative embodiments, where agent 2260 is a human, interface converter 2250 can include a screen, a keyboard, etc. An example is now described.

Figure 23:
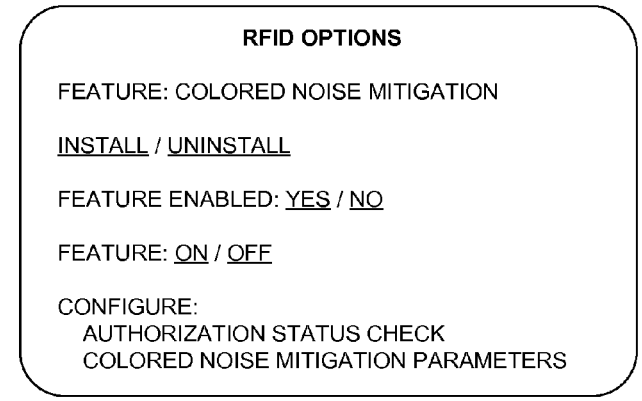
FIG. 23 is a sample screenshot of an interface converter such as the interface converter of FIG. 22, according to an embodiment.

FIG. 23 is a sample screenshot 2350 of an interface converter, such as the interface converter of FIG. 22. Screenshot 2350 can be that of a computer screen for a human agent, according to an embodiment. What is displayed in screenshot 2350 exposes the functionality of a utility, such as utility 2240. Inputs by the user via a keyboard, a mouse, etc., can ultimately control utility 2240. Accordingly, such inputs are received in the context of screenshot 2350. These inputs are determined from what is needed for controlling and operating utility 2240. An advantage with such interfacing is that agent 2260 can prepare RFID applications at a higher level, without needing to know how to control lower-level RFID operations. Such lower-level RFID operations can be as described in the Gen2 Spec, in other lower-level protocols, etc. Utility 2240 can be controlled in any number of ways. Some such ways are now described.

Returning to FIG. 22, one way interface converter 2250 can be implemented is as an Application Programming Interface (API). This API can control or provide inputs to an underlying software library, and so on.

Communications can be between agent 2260, interface converter 2250, and utility 2240. Such communications can be as input or can be converted, using appropriate protocols, etc. What is transmitted can encode commands, data, etc. Such communications can include any one or a combination of the following: a high-down communication HDNT from agent 2260 to interface converter 2250; a low-down communication LDNT from interface converter 2250 to utility 2240; a low-up communication LUPT from utility 2240 to interface converter 2250; and a high-up communication HUPT from interface converter 2250 to agent 2260. These communications can be spontaneous, or in response to another communication, or in response to an input or an interrupt, etc.

Commands are more usually included in communications HDNT and LDNT, for ultimately controlling utility 2240. Controlling can be in a number of manners. One such manner can be to install utility 2240, or just a feature of it. Such installing can be by spawning, downloading, etc. Other such manners can be to configure, enable, disable, or operate utility 2240, or just a feature of it. These commands can be standalone, or carry parameters, such as data, confidential information, etc. In some embodiments interface converter 2250 can convert these commands to a format suitable for utility 2240.

Data are more usually included in communications HUPT and LUPT. The data can inform as to success or failure of executing an operation. The data can also include tag data, which can be both codes read from tags (including confidential information) and data about reading tags (such as time stamps, date stamps, etc.). In some embodiments interface converter 2250 can convert the data to a format suitable for agent 2260, including in some cases aggregating, filtering, merging, or otherwise altering the format or utility of the data.

It should be noted that what passes across a single pure boundary is unchanged (by the definition of what is a pure boundary). But what passes through interface converter 2250 can be changed or not. More particularly, high-down communication HDNT can be being encoded similarly to, or differently from, low-down communication LDNT. In addition, low-up communication LUPT can be encoded similarly to, or differently from, high-up communication HUPT. When different, the difference can be attributed to interface converter 2250, which performs a suitable change, or conversion, of one communication to another. The change, or conversion, performed by interface converter 2250 is for exposing the functionality of utility 2240 to agent 2260, and vice versa. In some embodiments, a command is converted, but a parameter is passed along without being converted. Plus, what is not converted at one module may be converted at another. Such modules taken together can also form an interface converter according to embodiments.

Figure 24:
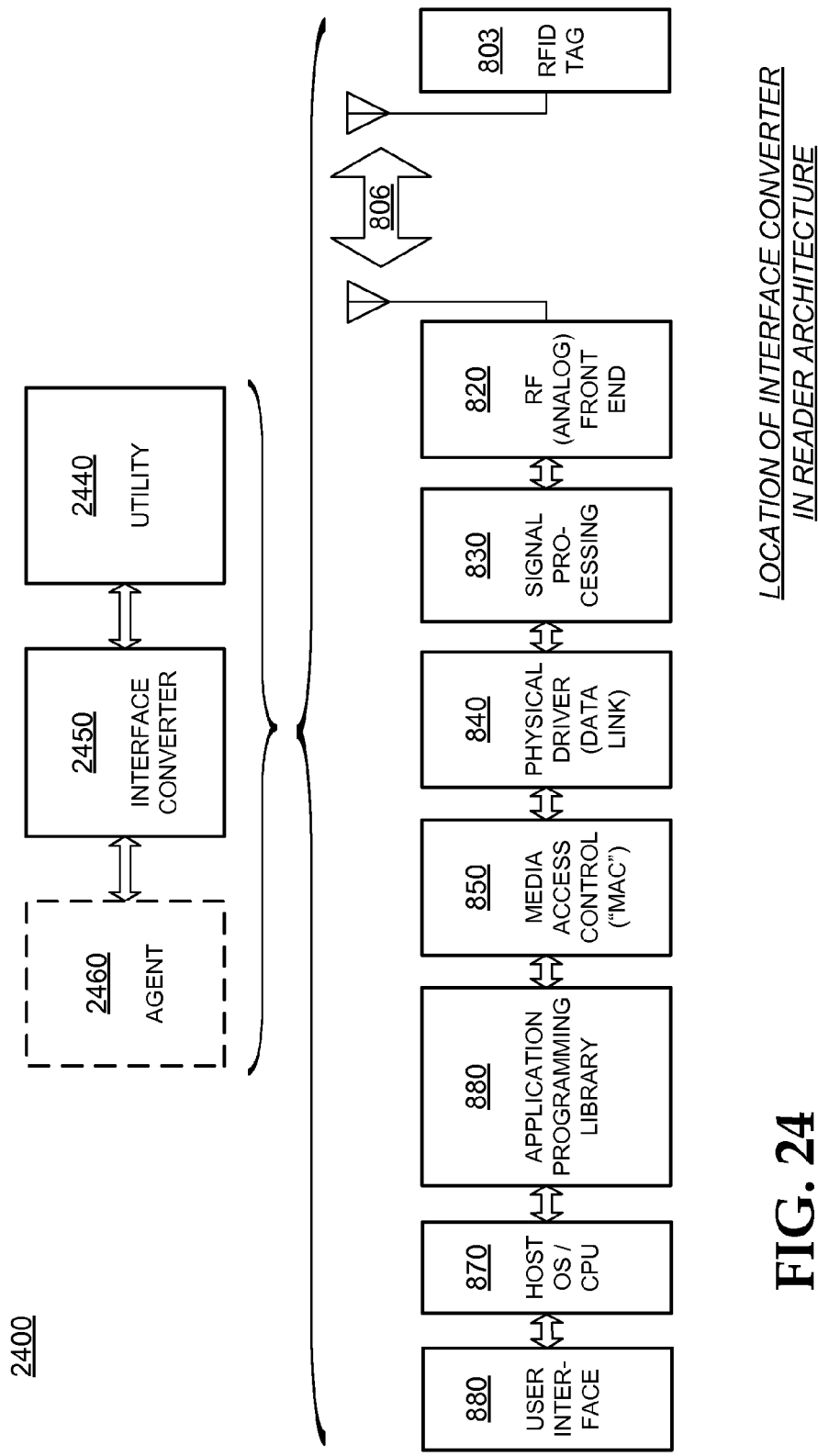
FIG. 24 is a diagram showing a correspondence for how the components of FIG. 22 can be implemented by those of FIG. 8, in embodiments where the interface converter is implemented by a reader.

Agent 2260, interface converter 2250, and utility 2240 can be implemented as part of a reader, or as a different device. For being implemented as part of a reader, FIG. 24 suggests a scheme 2400 where agent 2460, interface converter 2450, and utility 2440 can be implemented in connection with respective reader modules that are suitable, depending on the requirements.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

We claim:

1. A method for a Radio Frequency Identification (RFID) reader employing half-duplex communications to use an adaptive filter to mitigate colored noise, the method comprising:
    while transmitting an unmodulated radio-frequency (RF) carrier, receiving a first signal comprising the colored noise but no tag reply;
    adjusting weights of the adaptive filter to mitigate the colored noise in the first signal;
    transmitting a modulated RF carrier to instruct a tag to send a tag reply;
    while again transmitting the unmodulated RF carrier, receiving a second signal comprising the tag reply and the colored noise;
    recovering decision data from the second signal using the adaptive filter with the adjusted weights;
    estimating the colored noise in the second signal based on a difference between the second signal and the decision data; and
    using the estimate to further adjust the adaptive filter weights to further mitigate the colored noise.

2. The method of claim 1, wherein at least one of the recovering, estimating, and adjusting is performed by at least one of:
    a linear equalizer;
    a linear-predictive canceller; and
    a decision-feedback equalizer.

3. The method of claim 1, wherein the colored noise estimate is further derived from correlated noise components.

4. The method of claim 1, wherein the mitigating is accomplished by subtracting.

5. The method of claim 1, further comprising:
    implementing an adaptive algorithm from one of: a least-mean-square algorithm and a recursive least-squares algorithm; and
    adjusting a convergence behavior of the adaptive algorithm.

6. The method of claim 1, further comprising:
    instructing the tag to reply with an alternative preamble to improve the colored noise estimate.

7. The method of claim 1, further comprising:
    instructing the tag to send custom data for further adjusting.

8. The method of claim 1, further comprising:
    using the further adjusted adaptive filter weights to mitigate the colored noise in subsequently received signals.

* * * * *